US009610667B2

(12) United States Patent
Samukawa et al.

(10) Patent No.: US 9,610,667 B2
(45) Date of Patent: Apr. 4, 2017

(54) LENS EDGEING SYSTEM, METHOD OF DETECTING A TOOL EXCHANGE TIME AND METHOD OF MANUFACTURING SPECTACLE LENS

(71) Applicant: HOYA CORPORATION, Tokyo (JP)

(72) Inventors: Masahiko Samukawa, Tokyo (JP); Hidetoshi Nishimura, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/651,959

(22) PCT Filed: Nov. 19, 2013

(86) PCT No.: PCT/JP2013/081098
§ 371 (c)(1),
(2) Date: Jun. 12, 2015

(87) PCT Pub. No.: WO2014/091884
PCT Pub. Date: Jun. 19, 2014

(65) Prior Publication Data
US 2015/0314411 A1 Nov. 5, 2015

(30) Foreign Application Priority Data
Dec. 12, 2012 (JP) ................................. 2012-271231

(51) Int. Cl.
*B23Q 17/20* (2006.01)
*B24B 9/14* (2006.01)
(Continued)

(52) U.S. Cl.
CPC ..... *B23Q 17/0904* (2013.01); *B23Q 17/0995* (2013.01); *B23Q 17/20* (2013.01);
(Continued)

(58) Field of Classification Search
CPC ......... B24B 49/02; B24B 49/04; B24B 49/18; B24B 49/183; B24B 9/14; B24B 9/148;
(Continued)

(56) References Cited

U.S. PATENT DOCUMENTS 5,630,746 A 5/1997 Gottschald et al.
9,278,419 B2 * 3/2016 Hon ...................... B23Q 15/225
(Continued)

FOREIGN PATENT DOCUMENTS

EP 2 048 472 A1 4/2009
JP H06344246 A 12/1994
(Continued)

OTHER PUBLICATIONS

Jun. 16, 2015 International Preliminary Report on Patentability issued in International Application No. PCT/JP2013/081098.
(Continued)

*Primary Examiner* — Eileen Morgan
(74) *Attorney, Agent, or Firm* — Oliff PLC

(57) ABSTRACT

A lens edging system of the present invention includes: an edger configured to perform edging of a spectacle lens using an edging tool; a shape measurement device configured to measure an edging shape of a circumferential edge of the spectacle lens after edging by the edger; a memory part configured to store information regarding a reference shape of the edging tool used by the edger; a shape comparing and judging part configured to compare a measurement result obtained by the shape measurement device and a reference shape of the edging tool specified from the information stored in the memory part, and judge necessity/non-necessity for exchanging the edging tool based on a comparison result; and an information output part configured to output information regarding necessity for exchange when the shape comparing and judging part so judges.

10 Claims, 14 Drawing Sheets

(51) Int. Cl.
  *B24B 49/04*  (2006.01)
  *B23Q 17/09*  (2006.01)
  *G01M 11/02*  (2006.01)
  *B23Q 17/24*  (2006.01)
  *B24B 47/22*  (2006.01)
  *B24B 49/12*  (2006.01)

(52) U.S. Cl.
  CPC .......... *B23Q 17/2457* (2013.01); *B24B 9/148* (2013.01); *B24B 47/225* (2013.01); *B24B 49/12* (2013.01); *G01M 11/025* (2013.01); *G01M 11/0214* (2013.01)

(58) Field of Classification Search
  CPC B23Q 17/0904; B23Q 17/0995; B23Q 17/20; B23Q 17/2457; G01M 11/025
  USPC ................... 451/5, 21, 22, 42, 43, 255, 256
  See application file for complete search history.

(56) References Cited

U.S. PATENT DOCUMENTS

2003/0220056 A1* 11/2003 Wada ..................... B24B 9/148
                    451/177
2009/0268199 A1  10/2009 Inoguchi
2013/0260641 A1* 10/2013 Kikuchi ................. B24B 49/00
                    451/5
2014/0206258 A1* 7/2014 Peng ....................... B24B 51/00
                    451/5

FOREIGN PATENT DOCUMENTS

| JP | 2000198047 A | 7/2000 |
| JP | 3249111 B2 | 1/2002 |
| JP | 2002307263 A | 10/2002 |
| JP | 2011230206 A | 11/2011 |
| WO | 2008016066 A1 | 2/2008 |

OTHER PUBLICATIONS

Jan. 21, 2014 International Search Report issued in International Application No. PCT/JP2013/081098.

Aug. 8, 2016 Search Report issued in European Patent Application No. 13861567.9.

* cited by examiner

LENS EDGEING SYSTEM, METHOD OF DETECTING A TOOL EXCHANGE TIME AND METHOD OF MANUFACTURING SPECTACLE LENS

TECHNICAL FIELD

The present invention relates to a lens edging system used for edging a spectacle lens, a method of detecting a tool exchange time regarding an edging tool used by an edger that performs edging, and a method of manufacturing a spectacle lens.

DESCRIPTION OF RELATED ART

Edging of a spectacle lens is performed to form a lens circumferential edge into a shape that can be framed into a spectacle frame, using an edger that cuts and grinds the lens circumferential edge. In order to perform such an edging with high precision, a tool life of the edger used for edging should be appropriately managed. This is because exchange of the edger is required at a suitable time before arrival of the tool life (for example, before wear amount exceeds an allowable range), because the edger is worn by use.

It may be ideal and most preferable to detect a tool shape itself, to correctly manage the tool life of the edging tool. However, it is not preferable to measure and check the tool shape every time edging is performed in an actual production step, from a viewpoint of a production efficiency, etc. Also, it is conceivable to suppress reduction of the production efficiency due to reduction of a check frequency, by checking the tool shape in a stage when wear of the edger can be visually confirmed. However, in this case, a problem is that there is an adverse influence on a result of managing the tool life depending on a setting of the check frequency. Therefore, conventionally, regarding the management of the tool life, it is proposed to judge the tool life not by directly detecting the tool shape but measuring instead the one that is related to the tool life, by a parameter obtained during edging.

Specifically, as an example, a cutting sound or a grinding sound during edging is sensed by a sound collector, and a frequency of the sensed sound is analyzed by an artificial intelligence which has finished a mechanical learning of the frequency of the sensed sound in advance, (for example, see patent document 1).

Further, other example is as follows: a load value added on the tool during edging of an edged material (for example, current value, etc., of a driving part) is measured, and by comparing it with a predicted load value calculated from the edged material edged before, the tool life is judged (for example, see patent document 2).

PRIOR ART DOCUMENT

Patent Document

Patent document 1: U.S. Pat. No. 3,249,111 Publication
Patent document 1: JPA-2011-230206

SUMMARY OF THE INVENTION

Problem to be Solved by the Invention

However, in a conventional technique, judgment of the tool life is performed based on the abovementioned parameter obtained during edging, and therefore the following problem is generated.

Although the parameter obtained during edging can be a criterion for judging the tool life, it is not necessarily accurately reflect a wearing state, etc., of the tool. For example, abnormality of the cutting sound or the grinding sound disclosed in patent document 1 is not necessarily equal to the wearing state, etc., of the tool. Also, for example, patent document 2 teaches a method of previously collecting an edging load value for every kind of the edged material, and calculating the predicted edging load value for every kind of the collected edged material, and comparing it with the predicted edging load value, to thereby judge the tool life. However, even if the predicted edging load value is calculated for every kind, there is a large variation in the strength of the edged material of a certain specific kind, and its load value is also possibly varied, thus not always equal to the wearing state, etc., of the tool. Accordingly, even if the tool life is judged based on such a parameter, the judgment result includes error because its parameter does not accurately reflect the wearing state, etc., of the tool. As a result, it becomes difficult to realize the judgment of the tool life with high precision.

Therefore, an object of the present invention is to provide a lens edging system, a method of detecting a tool exchange time and a method of manufacturing a spectacle lens, capable of judging the tool life of the edging tool with higher precision than the conventional technique, while suppressing reduction, etc., of the production efficiency of edging the spectacle lens.

Means for Solving the Problem

In order to achieve the above-described problem, inventors of the present invention examine the edging of a spectacle lens first. Edging of a spectacle lens is performed to form a lens circumferential edge into a shape that can be framed into a spectacle frame, using an edger that cuts and grinds the lens circumferential edge. In such an edging, the shape of the lens circumferential edge after edging (for example, an edge shape including bevel), is approximately matched with the shape of the edging tool that performs the edging (for example, a tool cross-sectional shape of a bevel corresponding portion). That is, there is a unique characteristic of the edging such that the shape of the lens circumferential edge after edging is the shape approximately matching the shape of the edging tool (the same shape ideally).

In view of this point, the inventors of the present invention make strenuous efforts, and an unconventional new concept is found as follows: in view of the unique characteristic of the edging such that the shape of the edged part and the shape of the edging tool correspond to each other, by measuring the shape of the circumferential edge of the spectacle lens which is the edged part, and comparing this measurement result with an original reference shape of the edging tool, the tool life of the edging tool can be judged (necessity/non-necessity for exchanging the edging tool) can be judged.

The present invention is provided by the inventors of the present invention based on the abovementioned new concept.

According to a first aspect of the present invention, there is provided a lens edging system, including:
an edger configured to perform edging of a spectacle lens using an edging tool;
a shape measurement device configured to measure an edging shape of a circumferential edge of the spectacle lens after edging by the edger;

a memory part configured to store information regarding a reference shape of the edging tool used by the edger;

a shape comparing and judging part configured to compare a measurement result obtained by the shape measurement device and a reference shape of the edging tool specified from the information stored in the memory part, and judge necessity/non-necessity for exchanging the edging tool based on a comparison result; and an information output part configured to output information regarding necessity for exchange when the shape comparing and judging part so judges.

According to a second aspect of the present invention, there is provided the lens edging system of the first aspect, wherein the shape comparing and judging part compares a measurement result of the edging shape obtained in an edging interference avoidable area of the edging tool on the circumferential edge of the spectacle lens, and the reference shape of the edging tool.

According to a third aspect of the present invention, there is provided the lens edging system of the first or second aspect, wherein the edging interference avoidable area is selectively extracted based on a change ratio of a circumferential locus of the circumferential edge of the spectacle lens, in a lens thickness direction.

According to a fourth aspect of the present invention, there is provided the lens edging system of the first, second, or third aspect, wherein the shape comparing and judging part judges necessity/non-necessity for exchanging the edging tool, by comparing an edging shape of the circumferential edge of the spectacle lens and a reference shape of the edging tool and calculating a difference degree between them, and dividing a calculation result of the difference degree by an edge thickness of the lens at a measurement point of the edging shape, thereby obtaining a value converted to a difference per unit thickness, and comparing the converted value and a predefined threshold value.

According to a fifth aspect of the present invention, there is provided the lens edging system of the first, second, or third aspects, wherein the shape comparing and judging part extracts a characteristic amount of the edging shape of the circumferential edge of the spectacle lens and a characteristic amount of the reference shape of the edging tool, and compares these characteristic amounts with each other, to thereby judge necessity/non-necessity for exchanging the edging tool.

According to a sixth aspect of the present invention, there is provided a method of detecting a tool exchange time for detecting an exchange time of an edging tool used by an edger that performs edging of a spectacle lens; including:

the storing step of previously storing information regarding a reference shape of the edging tool;

the shape measurement step of measuring an edging shape of a circumferential edge of a spectacle lens after edging by the edger;

the shape comparing and judging step of comparing a measurement result and a reference shape of the edging tool specified from the information stored in the storing step when measurement is performed in the shape measurement step, and judging necessity/non-necessity for exchanging the edging tool based on a comparison result; and the exchange time detecting step of outputting information regarding the exchange time of the edging tool when it is so judged in the shape comparing and judging step.

According to a seventh aspect of the present invention, there is provided the method of detecting a tool exchange time of the sixth aspect, wherein the shape comparing and judging step includes data selection processing of selectively extracting the measurement result obtained in the shape measurement step, which is a comparison object to be compared with a reference shape of the edging tool.

According to an eighth aspect of the present invention, there is provided a method of manufacturing a spectacle lens, wherein a spectacle lens is formed by edging using an edger having an edging tool whose exchange time is managed by the method of the sixth or seventh aspect.

Effect of the Invention

According to the present invention, tool life can be judged with higher precision than a conventional technique, regarding an edging tool for edging a spectacle lens, while suppressing a reduction, etc., of a production efficiency of edging the spectacle lens.

DETAILED DESCRIPTION OF THE INVENTION

Embodiments of the present invention will be described hereafter based on the drawings.
1. Outline structure of an overall lens edging system
2. Manufacturing procedure of a spectacle lens
3. Procedure of detecting the tool exchange time
4. Modified example, etc.

1. Outline Structure of an Overall Lens Edging System

An outline structure of an overall lens edging system according to an embodiment of the present invention will be described first.

Figure 1:
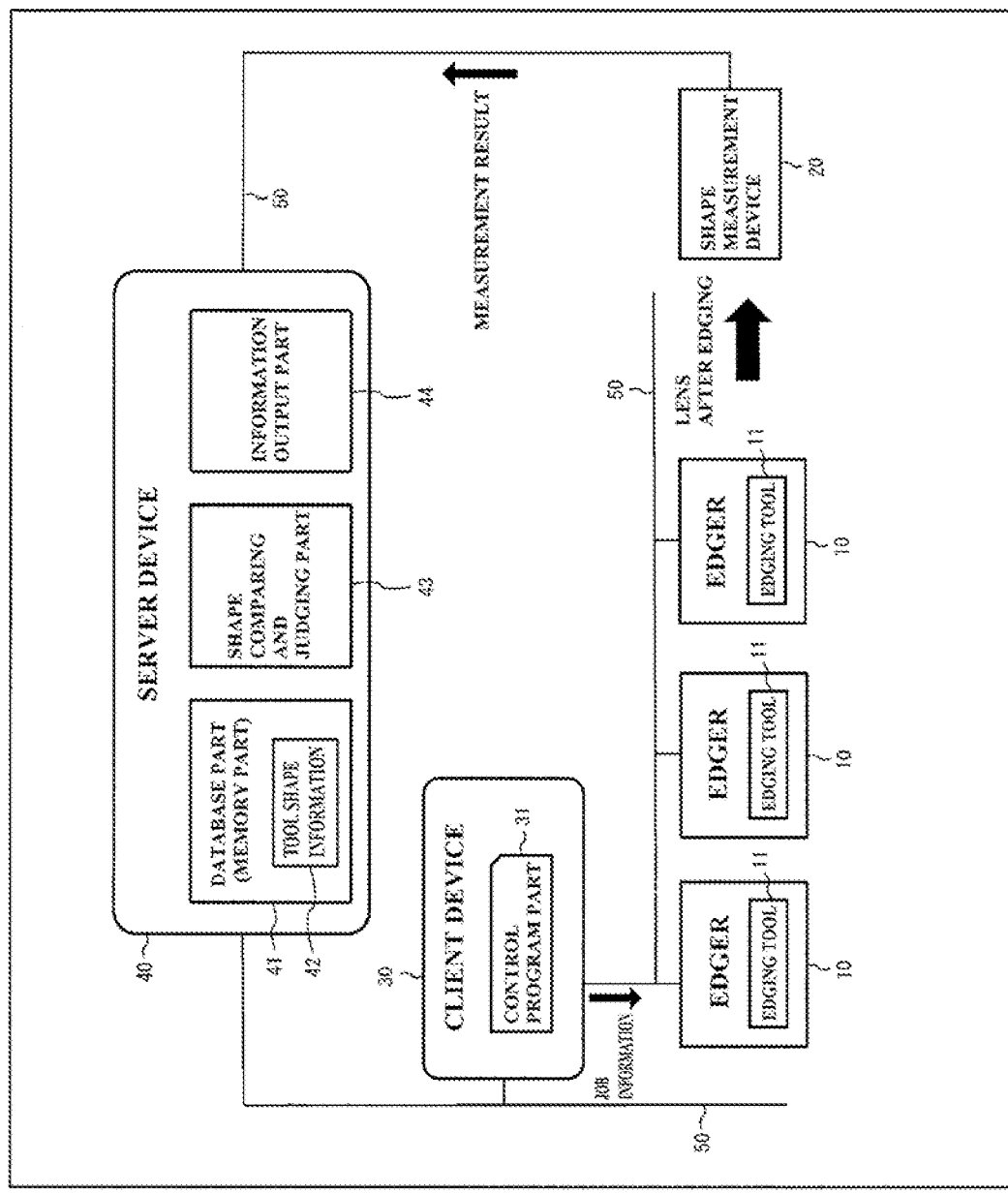
FIG. 1 is a block diagram showing an outline constitutional example of an overall lens edging system according to an embodiment of the present invention.

FIG. 1 is a block diagram showing an outline structural example of an overall lens edging system according to an embodiment of the present invention.

A lens edging system is used for edging a spectacle lens, and for example is constructed in an edging center of a spectacle lens. More specifically, the lens edging system is constituted of a plurality of edgers 10 installed in an edging center of the spectacle lens, a shape measurement device 20, a client device 30, a server device 40, and a communication line 50 for connecting these devices respectively.
(Edger)

A plurality of edgers 10 are the devices for edging the spectacle lens respectively. Edging is performed to an uncut lens (non-edged lens) having a prescribed outer shape. When the spectacle lens is edged, a circumferential edge of the uncut lens is edged into a shape that can be framed into a spectacle frame. More specifically, by edging the spectacle lens, an edge shape with a bevel is formed in the lens circumferential edge, corresponding to a frame shape of the spectacle frame into which the lens should be framed. Such an edging is performed by the edger 10, using an edging tool 11 that cuts and grinds the lens circumferential edge.

The edging tool 11 is constituted having a tool sectional shape substantially corresponding to the shape of the lens circumferential edge (particularly the shape of the bevel portion) after edging. For example, when using the edging tool 11 for forming a mountain-shaped bevel, the tool has a cross-sectional shape in an appearance of a valley shape corresponding to a mountain shape, with these concave/convex relations substantially matching with each other (ideally the same). Accordingly, there is a unique characteristic of the edging, such that the shapes are matched with each other (ideally the same) between the shape of the lens circumferential edge after edging performed using the edging tool 11, and the cross-sectional shape of the edging tool 11.

Such an edging tool 11 is mounted on the edger 10 in an exchangeable mode. A mounting mechanism, etc., in the exchangeable mode is not particularly limited, and may be acceptable if it is constituted using a publicly-known technique.

It is also acceptable that there are a plurality of edging tools 11 to be mounted on the edger 10. In this case, the plurality of edging tools 11 are selectively used, so that the edger 10 can perform edging. As the plurality of edging tools 11, there are tools with different edging contents (such as a beveling tool or a bevel polishing tool, etc.) or with different edging shape (such as a tool for forming a bevel having a top angle of about 120° or a tool for forming a bevel having a top angle of about 110°, or the like).

A different kind of models of the plurality of edgers 10 may coexist, if they can perform edging using the edging tool 11.
(Shape Measurement Device)

The shape measurement device 20 measures the edging shape of the circumferential edge of the spectacle lens after edging by the edger 10. By this measurement, the shape measurement device 20 detects the cross-sectional shape of the edge including a bevel on the circumferential edge of the spectacle lens.

The shape measurement device 20 is configured to perform such a shape measurement using a laser displacement meter in non-contact state. The shape measurement device 20 is also configured to perform shape measurement over the whole circumference of the spectacle lens, by changing a relative position relation between the laser displacement meter, etc., and the spectacle lens after edging. Regarding a specific structure for performing shape measurement, a publicly-known technique may be used (for example, see International Publication No. 2011/125829), and detailed explanation therefore is omitted here.
(Client Device)

The client device 30 is configured, having a control program part 31 for managing/controlling an operation of each edger 10. A plurality of client devices 30 may be provided in the system, in consideration of the number of the edgers 10 that exist in the system, and the number of the edgers 10 that can be managed by the client device 30.

The control program part 31 is the part for managing and controlling a job to be executed by the edger 10. Specifically, the control program part 31 is configured to control a job processing operation by the edger 10, by receiving information regarding the job managed by the server device 40 from the server device 40, and notifying the edger 10 of executing this job (namely, edging of the spectacle lens). The function exhibited by this control program part 31 may be realized using the publicly-known technique, and detailed explanation therefore is omitted here.
(Sever Device)

Although the server device 40 has a function as a computer similarly to the client device 30, it is different from the client device 30 in a point that it manages and controls the operation of the whole system. That is, the server device 40 manages and controls the operation of the whole system including the client device 30. This embodiment shows a case that the client device 30 and the server device 40 are provided as separate devices. However, these devices may be provided integrally as one device.

A terminal device not shown installed in a spectacle shop, is connected to the server device 40 via a wide area network such as Internet, etc., or the terminal device not shown installed in the edging center, is connected to the server device 40 via a communication line 50. Then, when an order regarding edging of the spectacle lens is received from one of these terminal devices, required processing is performed in the system, so that edging according to the order content is performed as a job.

Further, the server device 40 includes a database part 41, and is configured to uniformly mange information required for controlling the operation of the whole system using the database part 41.

The uniformly managed information in the database part 41, includes the information regarding the job received from the terminal device (that is, edging of the spectacle lens), or the information regarding the shape measurement result obtained by the shape measurement device 20 regarding the spectacle lens after edging.

Other than the abovementioned information, the information uniformly managed in the database part 41, includes tool reference shape information 42 for example, as one of the characteristic management information in this embodiment. The tool reference shape information 42 is the information regarding the reference shape of the edging tool 11 used by the edger 10. The reference shape of the edging tool 11 is an original shape of the edging tool 11, namely, the shape in an initial stage before using it in edging. When there are a plurality of edging tools 11 used by the edger 10, the tool reference shape information 42 can be managed for each type, in association with the information for identifying each type (for example, tool ID information).

The database part 41 has a function as s "memory part" of the present invention, for storing and uniformly managing the tool reference shape information 42.

Further, the server device 40 has a shape comparing and judging part 43 and an information output part 44 as characteristic functions in this embodiment.

The shape comparing and judging part 43 has a function of comparing a measurement result of the edging shape of the circumferential edge of the spectacle lens obtained from the shape measurement device 20, and the reference shape of the edging tool 11 specified from the tool reference shape information 42 stored and held in the database part 41, and judging the necessity/non-necessity for exchanging the edging tool 11 based on the comparison result. The method of judging necessity/non-necessity for exchange will be described later in detail.

The information output part 44 has a function of outputting information regarding the necessity/non-necessity for exchanging the edging tool 11, when the shape comparing and judging part 32 judges that exchange of the edging tool 11 is required. Information output destination and information output mode, etc., will be described later in detail.

These parts 43 and 44 may be respectively realized by executing a prescribed software program by the server device 40 as a computer. In this case, the software program is installed in the server device 40. However, the software program is not necessarily limited thereto, and may exist in other device in the system (for example, a control computer or the client device 30) if it can be accessed by the server device 40.

2. Manufacturing Procedure of the Spectacle Lens

A manufacturing procedure of the spectacle lens performed using the lens edging system configured as described above, will be simply described next.

Figure 2:
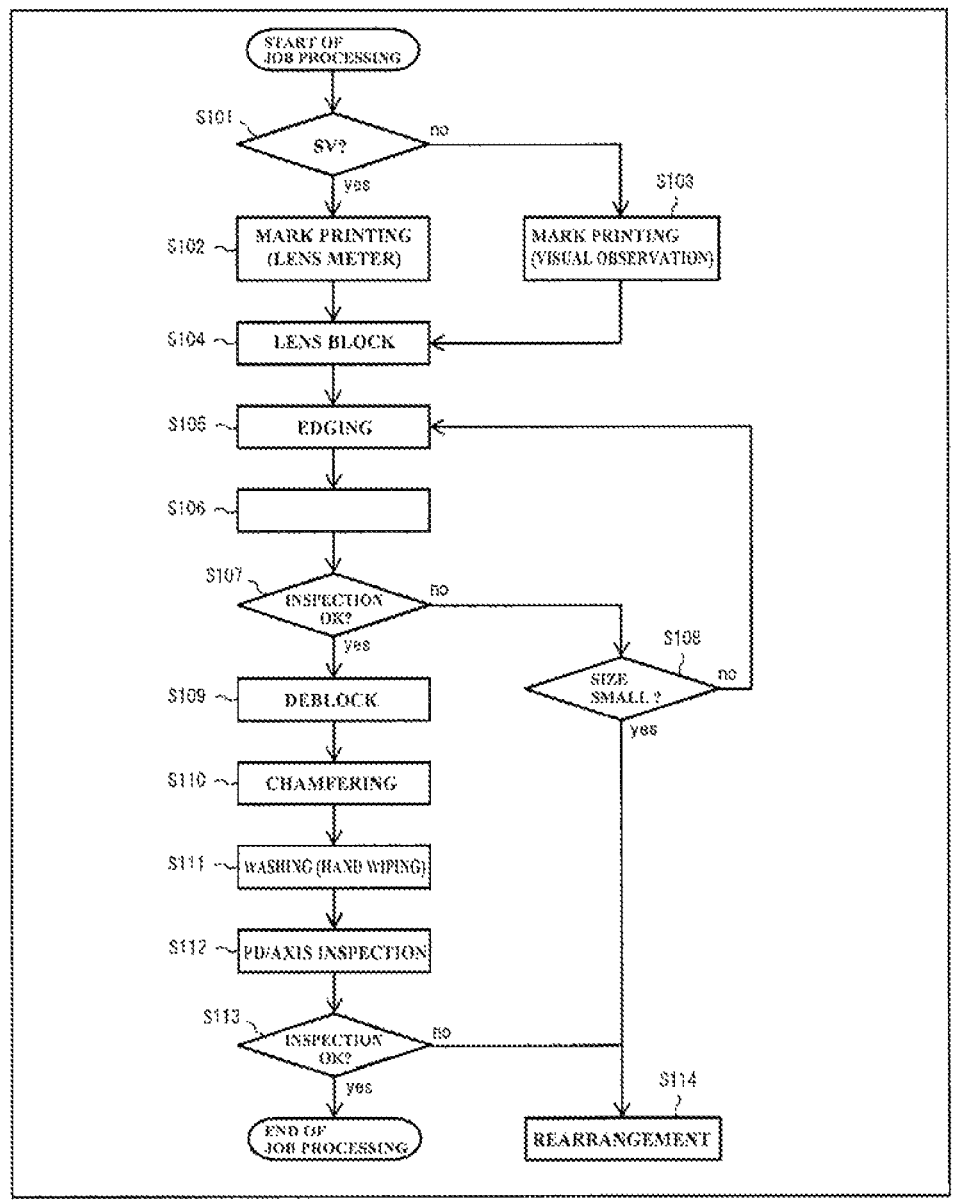
FIG. 2 is a flowchart showing a specific example of a procedure of an edging step in manufacturing a spectacle lens according to an embodiment of the present invention.

FIG. 2 is a flowchart showing a specific example of a procedure of an edging step in manufacturing a spectacle lens according to this embodiment.

In the edging center in which the lens edging system is constructed, when the server device 40 receives the order from the spectacle shop, etc., a worker selects an uncut lens according to the order content, as an edging object. Job number is barcoded on the selected uncut lens, for identifying the job. Further, whether or not the uncut lens is a single focus single vision (SV) lens, is judged by the worker (step 101, step is abbreviated as "S" hereafter), and when it is judged as the SV lens, an optical center and an astigmatic axis, etc., are measured by a lens meter not shown, and a dot print is attached thereon by this lens meter (S102). On the other hand, when it is not judged as the SV lens but judged as a progressive lens, hidden marks of the lens (two places) are visually confirmed by the worker, and the dot print is attached thereon using a pen, etc. (S103). When such a dot print is attached, the uncut lens is held by a holding jig by blocking with the dot print as a reference (S104).

Then, the blocked uncut lens is sent to one of the edgers 10 as an execution body, and when the uncut lens is set on this edger 10, the edger 10 starts edging so that the circumferential edge of the set uncut lens is formed into a lens shape according to the order from the spectacle shop, etc. (S105). At this time, based on a result of reading a barcode attached on the uncut lens, the edger 10 that performs edging requests notification of each kind of information required for executing edging, to the client device 30. Under such a request, the client device 30 receives each kind of required information from the database part 41 of the server device 40, and notifies the edger 10 of this information, which is a requester. That is, the edger 10 performs edging to the spectacle lens for each job (for each order from the spectacle shop) under management of the server device 40 and the client device 30. Then, when edging by the edger 10 is ended, the spectacle lens after edging is taken out from the edger 10, and the client device 30 is notified of the end of the edging from the edger 10, and the server device 40 is also notified of the end of the job from the client device 30. Thus, the edger 10 is set in a standby-state of executing the next job.

The spectacle lens after edging taken out from the edger 10, is sent to the shape measurement device 20, and the edging shape of the circumferential edge of the spectacle lens is measured (S106). Then, a circumferential length of the circumferential edge of the spectacle lens is recognized based on the measurement result, and whether or not the recognition result is set in a stipulated range, is judged by the server device 40 (S107). As a result, if the recognition result of the circumferential length is not set in the stipulated range, whether or not a size of the recognized circumferential length is smaller than the stipulated range, is judged (S108). Then, when the recognition result of the circumferential length is larger, rubbing can be applied twice (re-edging), and therefore edging by the edger 10 is performed again (S105). However, when the recognition result of the circumferential length is smaller, re-edging cannot be performed, and therefore the job itself is rearranged (S114).

In the lens edging system of this embodiment, the edging shape of the circumferential edge of the spectacle lens is measured (S106), and when the measurement result is sent to the server device 40, as described later in detail, the tool life of the edging tool 11 used by the edger 10 is judged by the server device 40.

Regarding the recognition result of the circumferential length of the spectacle lens after edging, when it is so judged by the server device 40 that the recognition result is set in the stipulated range, such an edging is judged as normal. Then, regarding the spectacle lens after edging, chamfering for the circumferential edge of the spectacle lens (110), washing (hand wiping) of the entire spectacle lens (S111), and inspection of a pupil distance (PD) of the spectacle lens or axis inspection, etc., (S112), are sequentially performed by the worker. If the result of this inspection is OK (S113), the edged spectacle lens is judged as non-defective, and delivered to the spectacle shop, etc., which is an orderer. However, when the inspection result is NG, the job itself is rearranged (S114).

The spectacle lens is manufactured according to the order from the spectacle shop, etc., through the abovementioned procedure in the lens edging system of this embodiment.

3. Procedure of Detecting the Tool Exchange Time

A procedure of judging the tool life of the edging tool 11, that is, a procedure of detecting the exchange time of the tool performed by the lens edging system of this embodiment in the abovementioned procedure of manufacturing the spectacle lens, will be described next.

Figure 3:
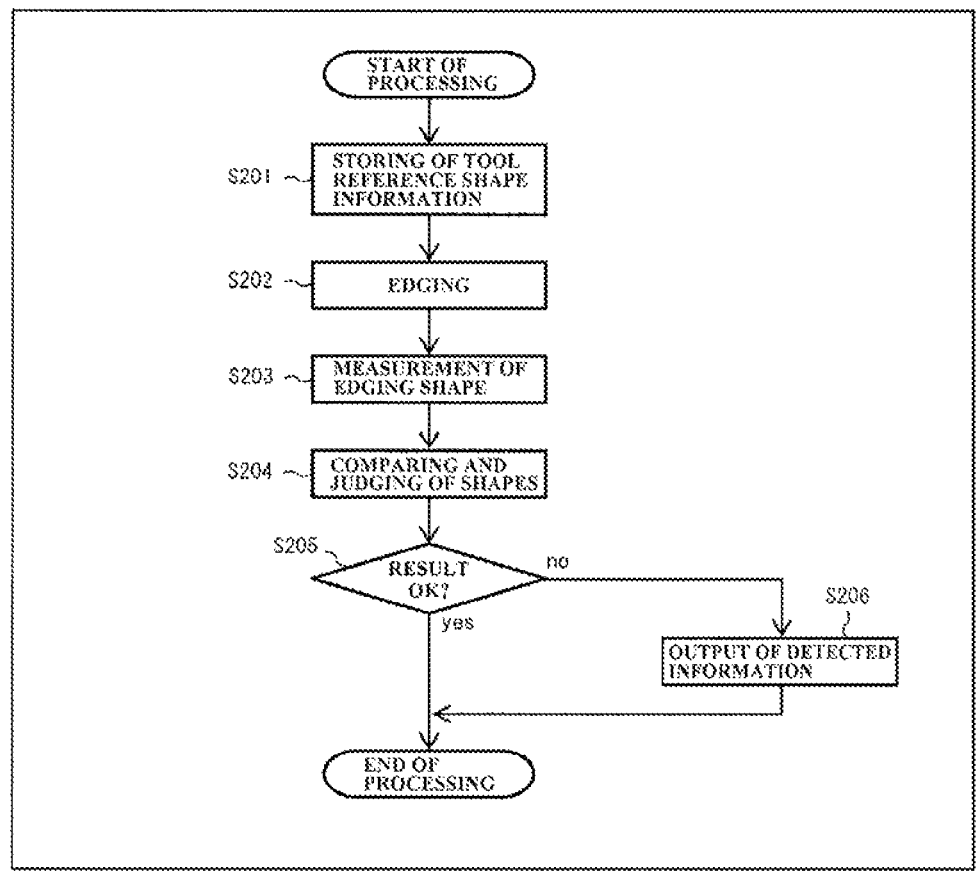
FIG. 3 is a flowchart showing a specific example of a procedure of detecting a tool exchange time according to an embodiment of the present invention.

FIG. 3 is a flowchart showing a specific example of the procedure of detecting the exchange time of the tool according to this embodiment.

In order to detect the exchange time of the tool, first, it is required to perform a storing step (S201) as a pre-processing, for storing in the database part 41, the tool reference shape information 42 regarding the edging tool 11 used by the edger 10. Then, edging step (S202) is performed for edging using the edging tool 11 by the edger 10, and thereafter shape measurement step (S203) is performed for measuring the edging shape of the circumferential edge of the spectacle lens by the shape measurement device 20, regarding the spectacle lens after edging. Still thereafter, based on the shape measurement result by the shape measurement device 20, shape comparing and judging step (S204) is performed for judging necessity/non-necessity for exchanging the edging tool 11, and if the judgment result is OK (S205), processing for detecting the exchange time of the tool is ended. However, when the judgment result is NO (S205), exchange time detection step (S206) is performed for outputting information regarding arrival of the exchange time of the edging tool 11.

These steps (S201 to S206) are respectively described hereafter sequentially in detail.

(Storing Step)

In storing step (8201), the tool reference shape information 42 regarding the edging tool 11 used by the edger 10, is inputted in the server device 40 prior to execution of the job (that is, edging of the spectacle lens) using the edging tool 11, and is previously stored in the database part 41 of the server device 40.

The tool reference shape information 42 may be inputted in the server device 40 by an operator, etc., by operating an operation part not shown of the server device 40. However, the present invention is not necessarily limited thereto, and for example, it can also be considered that by accessing a database server device of a tool maker connected via a communication line network, the tool reference shape information 42 is directly acquired from the database server device.

A data form, etc., of the tool reference shape information 42 to be inputted and stored, is not particularly limited, and the data form capable of sufficiently restore the reference shape of the edging tool 11 may be acceptable.

Figure 4:
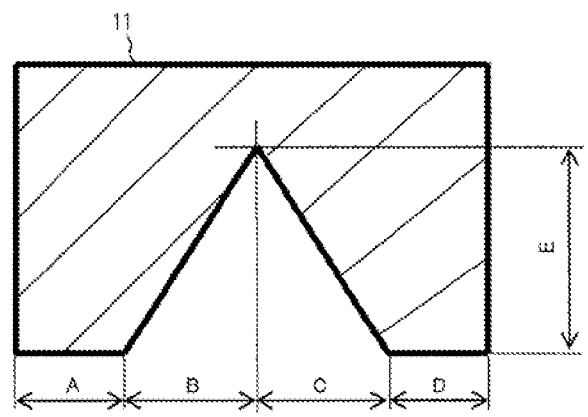
FIG. 4 is an explanatory view showing an example of specific data of tool reference shape information according to an embodiment of the present invention.

FIG. 4 is an explanatory view showing an example of specific data of the tool reference shape information 42.

For example, in the case of the edging tool 11 shown in the figure, it can be considered that numerical values of "A" to "E" in the figure are respectively inputted in the server device 40 while referencing a design view, etc., of the edging tool 11, and these numerical values are stored in the database part 41 in association with shape data of the edging tool 11. This is because by storing these contents, the reference shape of the edging tool 11 can be restored from the stored contents. However, if the reference shape of the edging tool 11 can be restored, an alternative parameter may be inputted and stored.

Further, it is not necessary to have a design shape of the edging tool 11 as the reference shape of the edging tool 11, and the shape at start of using the edging tool 11 may be acceptable.

(Edging Step)

In edging step (S202), the spectacle lens is edged using the edging tool 11 of the edger 10.

Figure 5:
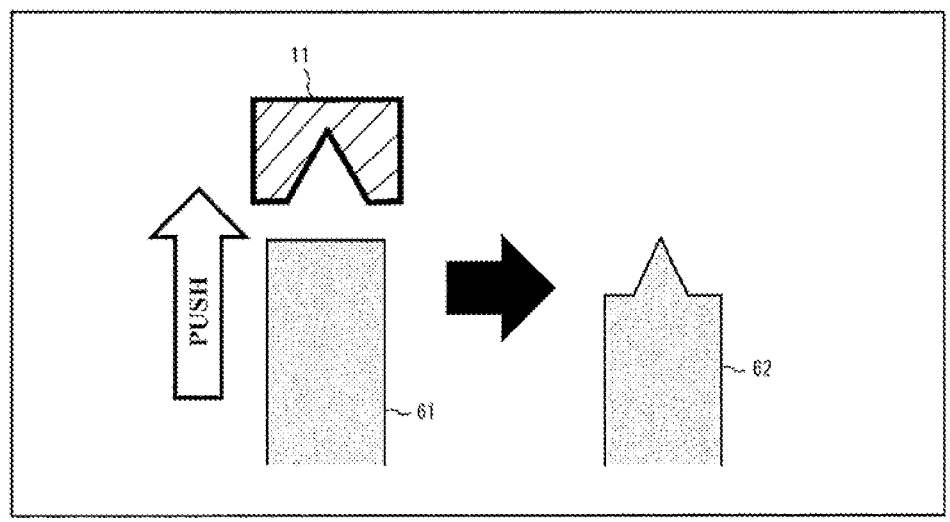
FIG. 5 is an explanatory view showing an outline of edging performed using an edging tool according to an embodiment of the present invention.

FIG. 5 is an explanatory view showing an outline of edging performed using the edging tool 11.

When edging the spectacle lens, an uncut lens 61 with barcode attached thereto for identifying the job, is sent to the edger 10 that performs edging. When the uncut lens 61 is sent, the edger 10 identifies the job by reading the barcode by a barcode reader, and notifies the client device 30 of an identification result of this job, and request the client device 30 to send the information regarding this job. The client device 30 requests the server device 40 to notify the client device 30 of the information regarding this job, based on the identification result of this job. When the information regarding the job is sent from the server device 40 in response to this request, the client device 30 sends the information regarding the job which has been sent to the client device 30, to the edger 10 which is a requester. The information regarding the job which is sent or received, includes for example, identification data of the job (job number, etc.), lens data (such as product code for specifying the material of the lens, lens power, lens thickness, surface shape curve value, backside shape curve value, the type of an antireflection film, and the type of a lens color, etc.), lens shape data (such as three-dimensional lens shape of a spectacle frame, two-dimensional lens shape, theoretical circumferential length, distinction between left eye and right eye, and frame/pattern, etc.), and edging condition data (such as the type of a lens material, and the type of the edging tool, etc.).

When the information regarding the job is sent, the edger 10 obtains the lens shape data by calculation based on the information, for specifying the shape of the circumferential edge of the lens which should be formed by edging. Further, the edger 10 selects the edging tool 11 used for edging the shape of the lens circumferential edge, and obtains edging locus data by calculation, for specifying a moving locus of the selected edging tool 11. Regarding a calculation method for obtaining each data, a publicly-known technique may be used, and detailed explanation therefore is omitted here.

When the edging locus data is obtained, the edger 10 displaces a relative position relation between the edging tool 11 and the uncut lens 61 based on the edging locus data, to thereby edge the spectacle lens. Specifically, an outer circumferential edge of the uncut lens 61 is pushed to the edging tool 11 while rotating the edging tool 11 around an axis, and in this state, the relative position relation between the edging tool 11 and the uncut lens 61 is displaced by rotation, etc., of the uncut lens 61. This is performed over the whole circumference of the uncut lens 61, to thereby obtain a spectacle lens 62 with bevel formed on the lens circumferential edge.

The spectacle lens 62 with bevel formed on the lens circumferential edge, is sent to the shape measurement device 20 thereafter, and is subject to measurement by the shape measurement device 20.

(Shape Measurement Step)

In shape measurement step (S203), the edging shape of the circumferential edge of the spectacle lens after edging by the edger 10, that is, the cross-sectional shape of the edge including the bevel of the circumferential edge of the spectacle lens, is measured by the shape measurement device 20.

Figure 6:
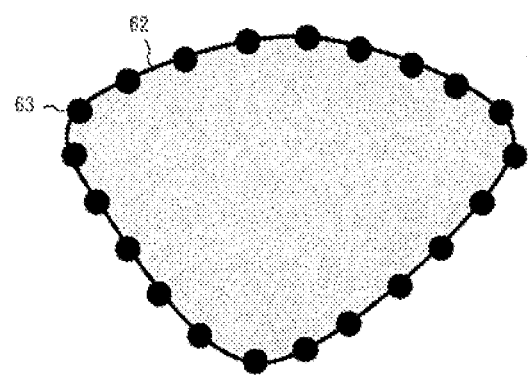
FIG. 6 is an explanatory view showing an outline of measuring a shape of a lens circumferential edge performed using a shape measurement device according to an embodiment of the present invention.

FIG. 6 is an explanatory view showing an outline of measuring the shape of the lens circumferential edge performed using the shape measurement device 20.

The shape measurement device 20 measures the shape over the whole circumference of the circumferential edge of the spectacle lens 62 after edging. The "whole circumference" called here, shows that the whole area in a circumferential direction of the lens circumferential edge is set as a measurement range. When the whole area in the circumferential direction of the lens circumferential edge is set as the measurement range, measurement points 63 where the shape is actually measured, may be limited to a plurality of places on the circumference of the lens circumferential edge as shown in FIG. 6, thereby responding to a measurement resolution, etc., of the shape measurement device 20.

Thus, by measuring the shape over the whole circumference of the lens circumferential edge by the shape measurement device 20, the server device 40 that receives the measurement result, can recognize a three-dimensional lens shape of the lens circumferential edge after edging, in a comprehensive consideration of the measurement result at each measurement point 63 over the whole circumference.

Figure 7:
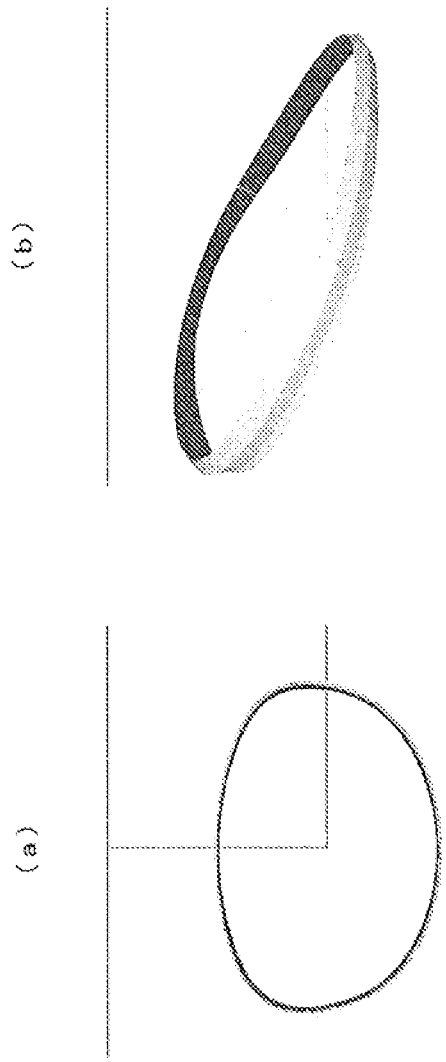
FIG. 7 is an explanatory view showing a specific example of a three-dimensional edging shape of the lens circumferential edge obtained after measurement using the shape measurement device according to an embodiment of the present invention.

FIG. 7 is an explanatory view showing a specific example of the three-dimensional lens shape of the lens circumferential edge obtained after measurement by the shape measurement device 20.

In the server device 40, the circumferential length of the lens circumferential edge can be calculated based on the three-dimensional lens shape as shown in the figure, obtained after measurement of the lens by the shape measurement device 20. Further, in the server device 40, not only the three-dimensional lens shape of the lens circumferential edge, but also the edging shape of the circumferential edge of the spectacle lens (that is, the cross-sectional shape of the edge including bevel) can be recognized.

In the explanation hereafter, data for specifying the three-dimensional lens shape over the whole circumference of the lens circumferential edge, is called "three-dimensional circumferential shape data", and the data for specifying the cross-sectional shape of the edge including bevel at each measurement point 63 is called "edge shape data".

(Shape Comparing and Judging Step)

The shape comparing and judging step (S204) includes, comparing a measurement result of measuring the edging shape of the circumferential edge of the spectacle lens, and the reference shape of the edging tool 11 specified from the tool reference shape information 42 stored and held in the database part 41, and judging necessity/non-necessity for exchanging the edging tool 11 based on the comparison result. Such a comparison and judgment are performed by the shape comparing and judging part 43 in the server device 40.

(First Specific Example of the Shape Comparing and Judging Step)

Figure 8:
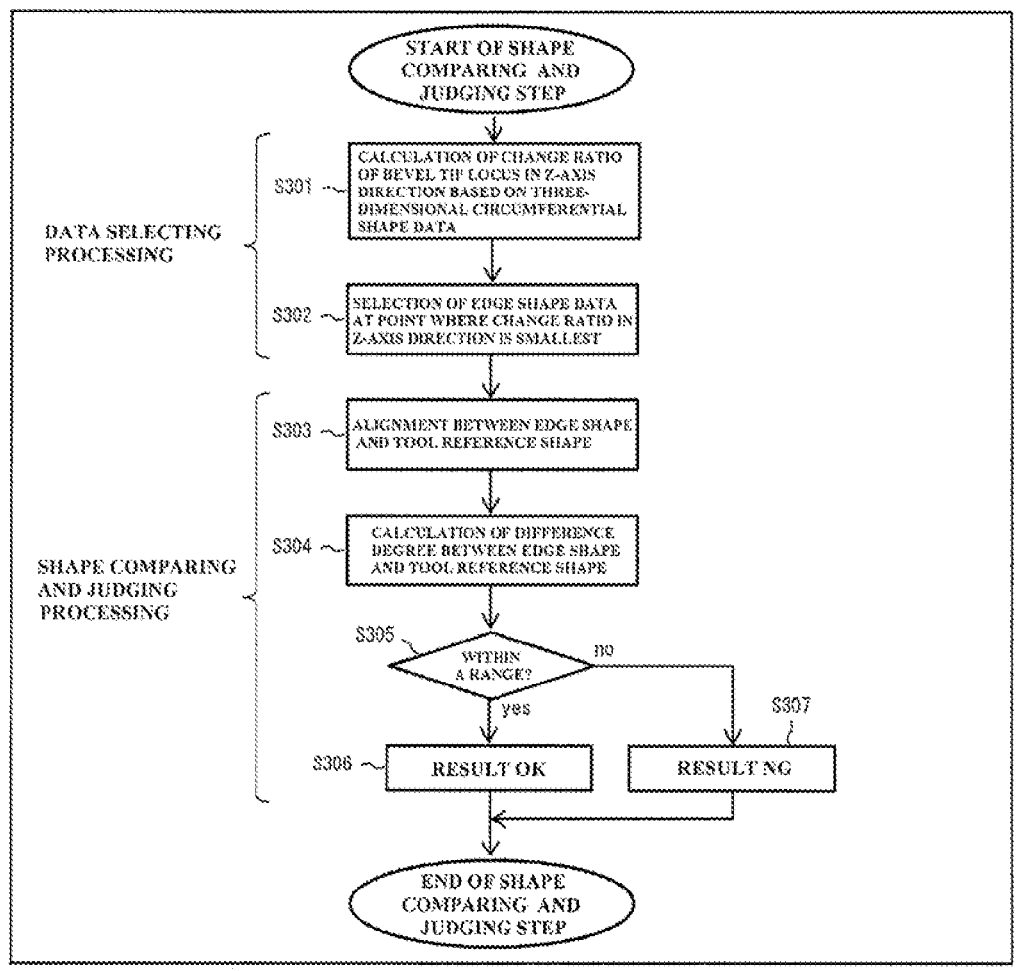
FIG. 8 is a flowchart showing a procedure of a first specific example of comparing and judging step according to an embodiment of the present invention.

Here, a first specific example of the shape comparing and judging step (S204) will be described first. FIG. 8 is a flowchart showing the procedure of a first specific example of the shape comparing and judging step (S204) according to this embodiment.

The shape comparing and judging step (S204) is roughly constituted of data selection processing and comparing and judging processing.

The data selection processing includes recognizing locus (called "bevel tip locus" hereafter) in a circumferential direction of the bevel tip on the circumferential edge of the lens after edging, based on the three-dimensional circumferential shape data obtained from the shape measurement device 20, and calculating the change ratio of the locus of the bevel tip in Z-axis direction (thickness direction of the lens) (S301). Then, edge shape data is selected at a measurement point where the change ratio in the Z-axis direction is smallest (S302).

Further, in the comparing and judging processing, in order to compare the edge cross-sectional shape specified by the edge shape data selected by the data selection processing, and the reference shape of the edging tool 11 specified from the tool reference shape information 42, alignment of each shape is performed (S303), and thereafter a difference degree between shapes is calculated (S304). Then, if the calculation result of the difference degree is set within a predefined range (S305), the judgment result is OK (S306). That is, since the shape is approximately matched with each other, problematic wear, etc., is not generated in the edging tool 11, and it is so judged that exchange is not required. On the other hand, if the calculation result is deviated from the defined range (S305), the judgment result is NO (S307). That is, it is so judged that exchange of the edging tool 11 is required, because the shape is not matched with each other.

These data selection processing and comparing and judging processing will be more specifically described, using specific examples.

(Data Selection Processing)

As described above, in the shape comparing and judging step (S204), the measurement result received from the shape measurement device 20, is compared with the reference shape of the edging tool 11 in the comparing and judging processing. Therefore, in view of the processing load and processing efficiency of the comparison, it is not preferable to set too many measurement points 63 for obtaining the measurement result, and the measurement points 63 are not required to exist over the whole circumference of the spectacle lens 62. In other words, it is preferable to selectively extract a point where the shape is compared with the reference shape of the edging tool 11, from the measurement points 63 over the whole circumference of the spectacle lens 62. Therefore, in the shape comparing and judging step (S204) of this embodiment, data selection processing is executed prior to the comparing and judging processing.

When selecting the point where the shape is compared with the reference shape of the edging tool 11, it is important to select a point where edging error is small. The "edging error" called here, means mismatch between an edge cross-sectional shape of the spectacle lens 62 after edging and a tool cross-sectional shape of the edging tool 11. The reason for selecting the point where the edging error is small, is that when there is a large difference between the edge cross-sectional shape of the lens circumferential edge and the reference shape of the edging tool, it is impossible to judge whether the difference is generated from the edging error or the difference is generated from wear of the edging tool 11.

When edging is performed by the edger 10, a great factor of largely disturbing the edge cross-sectional shape of the spectacle lens 62 is the generation of interference of the edging tool 11.

The interference of the edging tool 11 is generated as follows: namely, under influence of a curve of the lens to be edged, or a diameter or the cross-sectional shape of the edging tool 11 used for edging, the edging tool 11 and an edged place of the lens are interfered with each other during edging at a part other than a theoretical cutting point, and thinning or distortion, etc., is generated in the shape of the formed bevel. For example, the position of the edging tool 11 is not required to change in the Z-axis direction, unless the bevel tip locus is changed in the Z-axis direction (thickness direction of the lens), and therefore the thinning or distortion of the bevel shape is not generated. In contrast, the spectacle lens 62 has a curve according to a prescription content, and in most cases, the bevel tip locus is changed in the Z-axis direction. Therefore, when edging is performed, thinning or distortion, etc., is generated in the shape of the formed bevel, and the bevel is sometimes not positioned at an estimated position during bevel edging.

The edging error is probably small at such a point where interference of the edging tool 11 is hardly generated. Therefore, a point where the interference of the edging tool 11 is hardly generated, is preferably selected as the point where the edging error is considered to be small. An area on the circumference of the circumferential edge of the spectacle lens constituted of the point where the interference of the edging tool 11 is hardly generated, is called "an edging interference avoidable area". The following point is selected as the point constituting the edging interference avoidable area (namely, the points where the interference of the edging tool 11 is generated).

Figure 9:
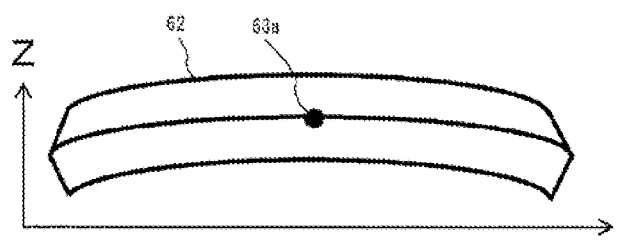
FIG. 9 is an explanatory view showing a specific example of a point constituting an edging interference avoidable area according to an embodiment of the present invention.

FIG. 9 is an explanatory view showing a specific example of the point constituting the edging interference avoidable area. As shown in the figure, regarding the change of the bevel tip locus in the Z-axis direction (thickness direction of the lens), point 63a where the change ratio in the Z-axis direction is smallest in the circumferential area can be given as the point constituting the edging interference avoidable area. If the change ratio in the Z-axis direction is small, the change amount of the edging tool 11 in the Z-axis direction is also small, and the interference of the edging tool 11 is hardly generated, which is a factor of the thinning or distortion, etc., of the bevel shape.

In order to obtain the edge shape data at the point constituting the edging interference avoidable area, the data selection processing is performed. In the data selection processing, first, the change ratio of the bevel tip locus in the Z-axis direction is calculated based on the three-dimensional circumferential shape data (S301), and subsequently the edge shape data is selected at a measurement point where the change ratio in the Z-axis direction is smallest (S302).

Figure 10:
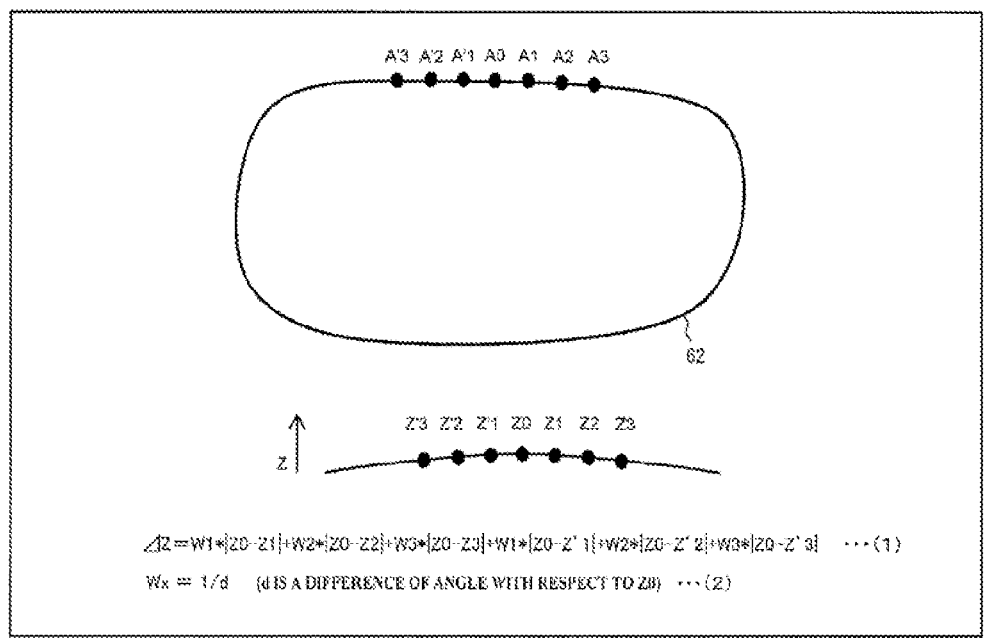
FIG. 10 is an explanatory view showing a specific example of a calculation method of a change ratio of a bevel tip locus in Z-axis direction according to an embodiment of the present invention.

FIG. 10 is an explanatory view showing a specific example of a calculation method of the change ratio of the bevel tip locus in the Z-axis direction.

In calculating the change ratio of the bevel tip locus in the Z-axis direction, point A0 out of the measurement points over the whole circumference of the spectacle lens 62 is selected as a target point, and a plurality of points A1, A2, A3, A', 1, A', 2, A', 3 are extracted, which are neighbor to the target point A0 back and forth in the circumferential direction. The number of the extracted neighboring points can be variably set according to a tool diameter, etc., of the edging tool 11. Then, the position of each point in the Z-axis direction is calculated, so that an absolute value of the difference between the point Z0 and points Z1, Z2, Z3, Z', 1, Z' 2, Z' 3, is respectively defined as a change amount ΔZ in the Z-axis direction. At this time, a point close to the point Z0 is weighed. Specifically, the change amount Z0 is calculated using the following formula (1).

$$\Delta Z = W1 \times |Z0-Z1| + W2 \times |Z0-Z2| + W3 \times |Z0-Z3| + W1 \times |Z0-Z'1| + W2 \times Z0-Z'2| + W3 \times |Z0-Z'3| \quad (1)$$

In this formula (1), Wx (wherein x=; 1, 2, 3) for weighing can be obtained by the following formula (2).

$$Wx = 1/|d| \quad (2)$$

(Wherein, |d| is the absolute value of the difference of an angle formed by each point of A1, A2, A3, A', 1K A', A', 2, A', 3 with respect to A0)

The calculation using the abovementioned formula (1) and formula (2) is repeatedly carried out for all measurement points over the whole circumference of the spectacle lens 62, and a point where the change amount ΔZ is smallest is extracted from them, to thereby select the edge shape data at the measurement point where the change ratio is smallest in the bevel tip locus in the Z-axis direction. Formula (1) and formula (2) given here as example, is simply one of the specific examples used for selecting the edge shape data, and the change ratio in the Z-axis direction may be calculated using other calculation formula.

As described above, in the data selection processing in the shape comparing and judging step (S204), the edge shape data is selected at the measurement point where the change ratio is smallest in the bevel tip locus in the Z-axis direction, as the point constituting the edging interference avoidable area. Thus, the number of the point to be compared with the reference shape of the edging tool 11 in the comparing and judging processing, can be drastically reduced compared with a case when data selection processing is not performed. In addition, the selected edge shape data is obtained at the point constituting the edging interference avoidable area, and therefore the influence of the edging error is excluded.

Here, in the data selection processing, the case of selecting the point (namely, one point) where the change ratio is smallest in the Z-axis direction is given as an example. However, it can be considered that a plurality of points are selected, provided that the edging interference avoidable area is constituted thereby.

(Comparing and Judging Processing)

In the comparing and judging processing performed after the data selection processing, shapes are compared between the edge cross-sectional shape specified by the edge shape data selected by the data selection processing, and the reference shape of the edging tool 11 specified from the tool reference shape information 42.

Figure 11:
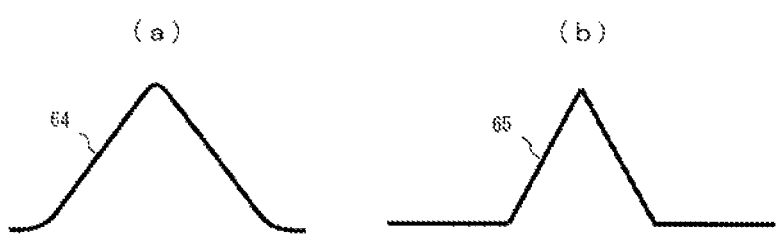
FIG. 11 is an explanatory view (No. 1) showing a specific example of a comparison method of comparing an edging shape of a spectacle lens edge portion and a reference shape of an edging tool according to an embodiment of the present invention.
Figure 12:
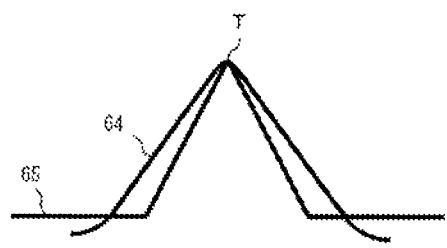
FIG. 12 is an explanatory view (No. 2) showing a specific example of a comparison method of comparing the edging shape of the circumferential edge of the spectacle lens and the reference shape of the edging tool according to an embodiment of the present invention.

FIG. 11 and FIG. 12 are explanatory views showing a specific example of a comparing method of comparing the shapes between the edging shape of the circumferential edge of the spectacle lens and the reference shape of the edging tool 11.

In performing the comparing and judging processing, the shape comparing and judging part 43 acquires first, edge shape data 64 for specifying the edge cross-sectional shape which is the edging shape of the circumferential edge of the spectacle lens, and shape data 65 (called "reference shape data" hereafter) for specifying the reference shape of the edging tool 11.

As described above, the edge shape data 64 is acquired by selecting it by the data selection processing. Thus, the shape comparing and judging part 43 acquires the edge shape data 64 for specifying the shape as shown in FIG. 11(*a*). A data form of the acquired edge shape data 64 is not particularly limited, if data can be compared between the edge shape data 64 and the reference shape data 65 described later.

The shape comparing and judging part 43 acquires identifying information for specifying the edger 10 that performs edging to the lens circumferential edge, and information for specifying the type of the edging tool 11 (such as tool ID information) used for edging by the edger 10, based on the information, etc., regarding the job, together with acquisition of the edge shape data 64.

Meanwhile, the reference shape data 65 is acquired by accessing the database part 51 of the server device 40. Specifically, the tool reference shape information 42 regarding the corresponding type of edging tool 11, is read from the database part 41, using the information (such as tool ID information) as a search key, which is the information regarding the edging tool 11 acquired together with the edge shape data 64. The tool reference shape information 42 read at this time, is sufficient to recover the reference shape of the edging tool 11. Accordingly, when the tool reference shape information 42 is read from the database part 41, the shape comparing and judging part 43 acquires the reference shape data 65 for specifying the reference shape of the edging tool 11 as shown in FIG. 11(*b*) for example.

When these shape data 64, 65 are acquired, subsequently, the shape comparing and judging part 43 compares the shapes specified by the acquired shape data 64 and 65 respectively. It can be considered that the shape data 64 and 65 are compared by the following method.

First, the edge cross-sectional shape specified by the edge shape data 64, and the reference shape of the edging tool 11 specified by the reference shape data 65, are aligned with each other by the shape comparing and judging part 43 (S303). Specifically, as shown in FIG. 12, the shapes specified by the shape data 64 and 65 are aligned with each other at each prescribed reference point T (specifically at the top of the bevel shape). The position of the reference point T may be specified using the publicly-known technique such as detecting a maximum value in a vertical direction of the figure.

Then, after such an alignment, the shape comparing and judging part 43 calculates a difference degree specified by the shape data 64 and 65 respectively, in the aligned state (S304). The difference degree may be calculated by converting the difference degree between each shape, to a numerical value. For example, it can be considered that the conversion to the numerical value is carried out using a publicly-known index such as SAD (Sum of Absolute Difference) for obtaining a numerical value by the sum of absolute values of the difference between the edge shape data and the reference shape data, and SSD (Sum of Squared Difference) for obtaining the numerical value by the sum of squared difference between the edge shape data and the reference shape data. More specifically, when a lateral position is indicated by x, a vertical position of the edge shape data at x is indicated by f(x) in FIG. 12, and a vertical position of the reference shape data is indicated by g(x), SAD and SSD are expressed by the following formula.

[Formula 1]

$$SAD = \int |f(x) - g(x)| \quad (3)$$

[Formula 2]

$$SSD = \int (f(x) - g(x))^2 \quad (4)$$

In principle, an integral range in the abovementioned formula (3) and formula (4) is set as an entire range of x in which both of the edge shape data and the reference shape data exist. However, the integral range may also be set as a certain specific range. For example, there is a great change observed in the vicinity of the top of the bevel if the bevel edging tool is worn. Therefore, it is conceivable to utilize such a property, to thereby set only a fixed range in the vicinity of the bevel top, as the integral range.

However, the edge thickness of the spectacle lens is different in each lens. Therefore, if the value of the difference degree is used as it is, which is calculated using SAD and SSD, etc., the value of the difference degree becomes probably larger, even in a case that there is no difference between a lens shape having a thick edge and the tool reference shape. This is because in the case of SAD for example, a differential area of each shape of the edge shape data and the reference shape data is calculated, but if the edge thickness is large, the differential area (namely, the value of the difference degree by SAD) is also large accordingly.

In order to respond to such a situation, it is conceivable to set a threshold value for example for each edge thickness (namely, threshold value showing whether or not wearing occurs) for comparing and judging process described later. However, if the threshold value is set for each edge thickness, judgment processing based on this threshold value is significantly complicated.

Therefore, when the value of the difference degree is calculated using SAD and SSD, etc., the calculation result is divided by the edge thickness of the lens at a measurement point of the edge shape data, and is converted to the difference degree per unit thickness. Then, the value after conversion is compared with a predefined threshold value as described later. Thus, the threshold value for comparison is not required to be set for each edge thickness, and one threshold value can be used, irrespective of the edge thickness. Also, as described above, when the integral range in formula (3) and formula (4) is set as the specific range only in the vicinity of the bevel top, there is no necessity for conversion to the difference degree per unit thickness.

Thereafter, the shape comparing and judging part 43 compares the numerical value obtained by calculating the difference degree of each shape, with the predefined threshold value for each type of the edging tool 11, and whether or not the numerical value as the calculation result of the difference degree is set in a range of the predefined threshold value, is judged (S305). As a result, when the calculation result of the difference degree is set in the defined range, the judgment result is judged as OK (S306). Meanwhile, when the calculation result of the difference degree is out of the defined range, it cannot be said that the shapes specified by each shape data 64, 65 are similar to each other, and since each shape supposed to be approximately matched with each other originally, is regarded otherwise actually, the shape comparing and judging part 43 so judges that a wearing limit arrives in the edging tool 11 (namely, wearing amount exceeds an allowable range). That is, the judgment result is NG (S307), and each shape is non-matched state, and therefore it is so judged that exchange of the edging tool 11 is required.

The shape comparing and judging part 43 compares the shape data 64 and 65 with each other by the abovementioned method, and judges necessity/non-necessity for exchanging the edging tool 11 based on the comparison result, every time the measurement result is received from the shape measurement device 20, and the edge shape data 64 is selected from the measurement result. However, the necessity/non-necessity for exchange is not required to be judged every time as described above, but may be judged at a previously set prescribed timing (for example, at a timing after the measurement result is received from the shape measurement device 20 prescribed number of times).

(Second Specific Example of the Shape Comparing and Judging Step)

A second specific example of the shape comparing and judging step (S204) will be described next.

Figure 13:
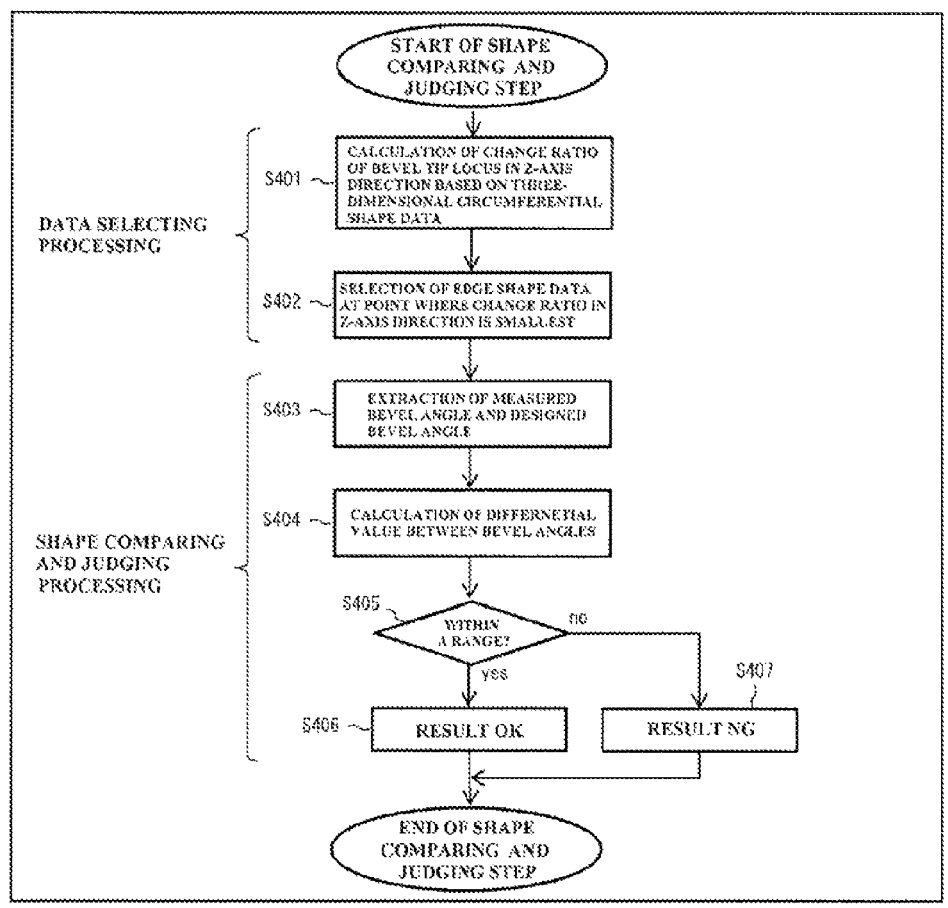
FIG. 13 is a flowchart showing a procedure of a second specific example of comparing and judging the shape according to an embodiment of the present invention.

FIG. 13 is a flowchart showing a procedure of the second specific example of the shape comparing and judging step (S204) according to this embodiment.

The shape comparing and judging step (S204) shown in the figure is roughly divided into data selection processing (S401, S402), and comparing and judging processing (S403 to S407).

The data selection processing (S401, S402) is similar to the abovementioned case of the first specific example (see S301 and S302 in FIG. 8). Accordingly, the explanation therefore is omitted here.

However, the comparing and judging processing (S403 to S407) is different from the abovementioned case of the first specific example. The comparing and judging processing of the second specific example will be described in detail hereafter, with specific examples.

(Comparing and Judging Processing)

In the comparing and judging processing of the second specific example, it is not the processing of evaluating the difference degree between shapes as shown in the first specific example, but the processing of extracting a characteristic amount of each shape and comparing the characteristic amounts with each other.

For example, when wear of the edging tool 11 is progressed, the bevel shape after edging is likely to have a gentle angle of the bevel top (simply called "bevel angle" hereafter) by performing edging using the edging tool 11. Therefore, it is conceivable to extract the bevel angle as the characteristic amount of the bevel shape in the second specific example.

That is, after the edge shape data 64 and the reference shape data 65 are acquired, the shape comparing and judging part 43 extracts the bevel angle (called "measured bevel angle" hereafter) in the edge cross-sectional shape specified by the edge shape data 64, and the bevel angle (called "designed bevel angle" hereafter) in the reference shape of the edging tool 11 specified by the reference shape data 65 respectively, based on each of the shape data 64 and 65 (S403).

Figure 14:
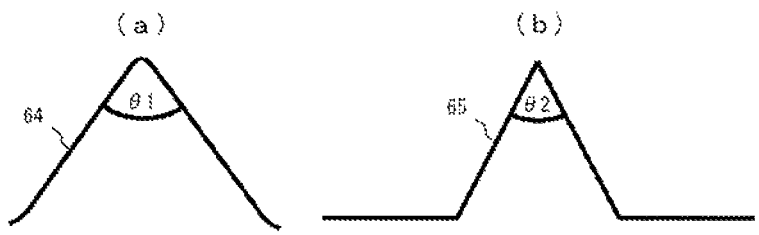
FIG. 14 is an explanatory view showing a specific example of a measured bevel angle and a designed bevel angle according to an embodiment of the present invention.

FIG. 14 is an explanatory view showing a specific example of the measured bevel angle and the designed bevel angle according to this embodiment.

Specifically, as shown in FIG. 14(*a*), the shape comparing and judging part 43 extracts bevel angle $\theta 1$ in the bevel shape specified by the edge shape data 64 as the measured bevel angle, and as shown in FIG. 14(*b*), extracts bevel angle $\theta 2$ in the bevel shape specified by the reference shape data 65 as the designed bevel angle.

The bevel angle is extracted using the following method for example.

Figure 15:
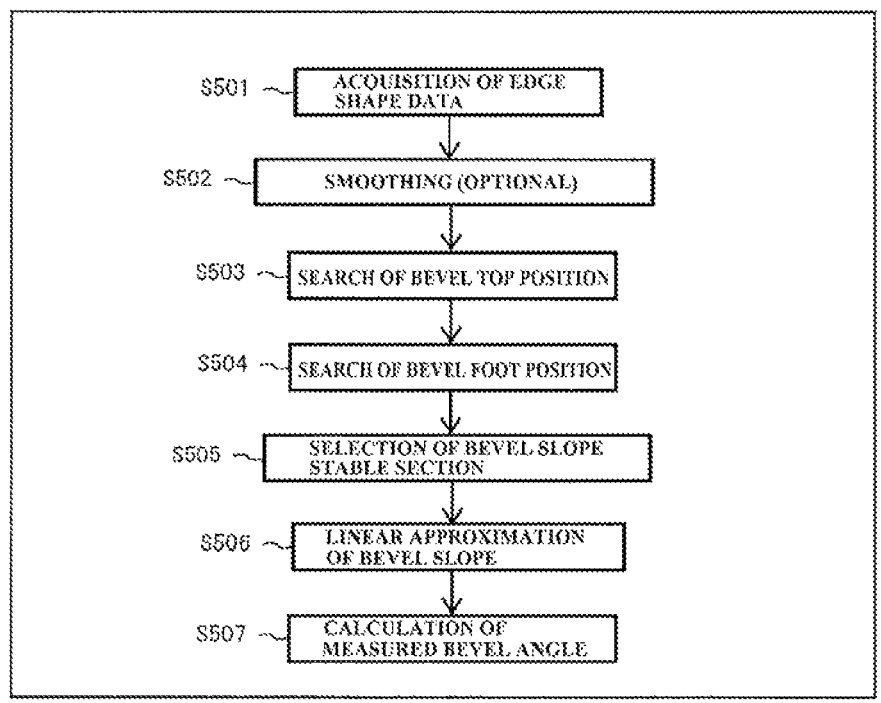
FIG. 15 is a flowchart showing a specific example of a procedure of extracting a bevel angle according to an embodiment of the present invention.

FIG. 15 is a flowchart showing a specific example of a procedure of extracting the bevel angle according to this embodiment.

An example of the figure shows a processing procedure for extracting the measured bevel angle $\theta 1$ from the edge shape data 64.

When the measured bevel angle $\theta 1$ is extracted from the edge shape data 64, first, the edge shape data 64 is acquired (S501), and publicly-known smoothing processing (such as median filter, etc.) is applied to the acquired edge shape data 64 as needed for the purpose of removing noise (S502). Then, the position of the bevel top in the edge shape data 64 is searched (S503). Specifically, the position where the edge shape data has a maximum value in the numerical group constituting the edge shape data 64 in a bevel projecting direction (for example, in an upper direction in FIG. 14(*a*)), may be set as a bevel top position. Further, a bevel foot position in the edge shape data 64 is searched (S504).

Figure 16:
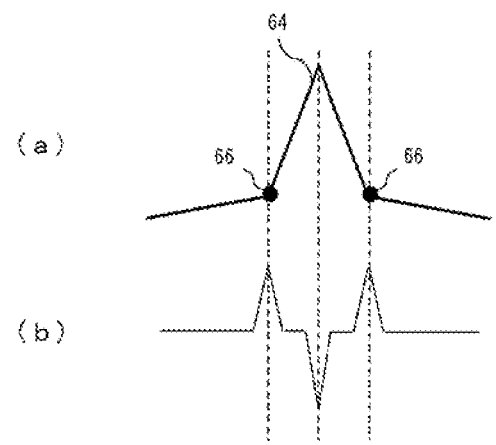
FIG. 16 is an explanatory view (No. 1) showing a specific example of a bevel foot position according to an embodiment of the present invention.
Figure 17:
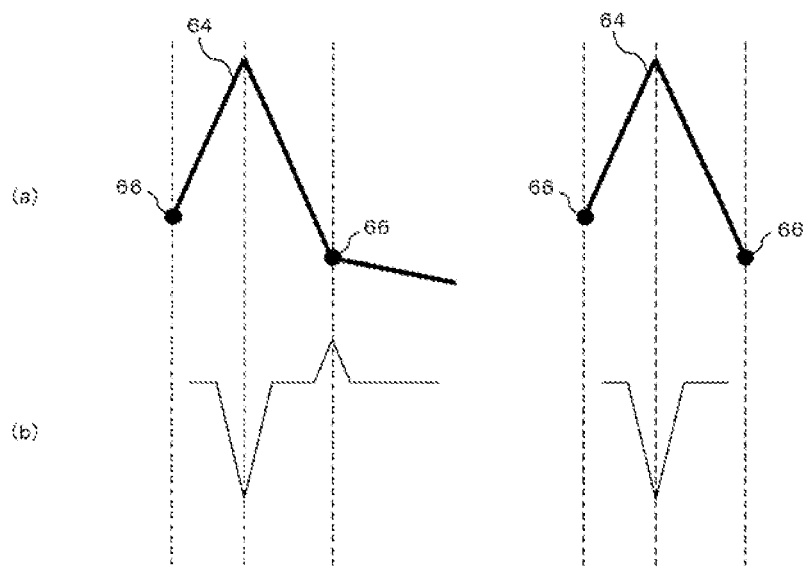
FIG. 17 is an explanatory view (No. 2) showing a specific example of the bevel foot position according to an embodiment of the present invention.

FIG. 16 and FIG. 17 are explanatory views showing a specific example of the bevel foot position according to this embodiment.

As shown in FIG. 16, in this embodiment, a bevel foot position 66 in the edge shape data 64 (see FIG. 16(*a*)), is defined as the position corresponding to a maximum value in the case of second-derivating the numerical group constituting the edge shape data 64 (see FIG. 16(*b*)). Accordingly, the bevel foot position may be searched by second-derivating the edge shape data 64.

When the edge thickness is thin in the lens to be edged, as shown in FIG. 17(*a*), there is no bevel foot at both sides or one side of the bevel top in some cases. In this case, as shown in FIG. 17(*b*), there is no maximum value in the second derivative of the edge shape data 64, or there is only one maximum value. Therefore, an end point at the side where there is no maximum value, is set as the bevel foot position.

Thereafter, the measured bevel angle $\theta 1$ is extracted. The measured bevel angle $\theta 1$ can be obtained by calculation processing based on the bevel top position (one point) and the bevel foot position (two points), if these positions are found. However, there is a possibility that the measured bevel angle $\theta 1$ is larger than an actual bevel angle.

Figure 18:
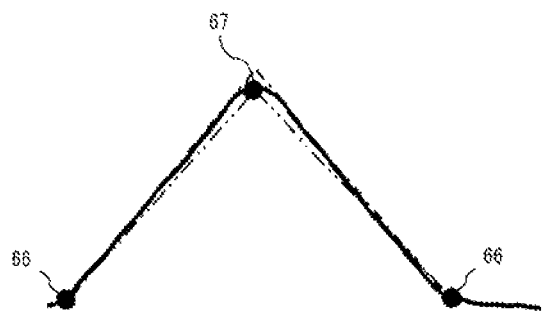
FIG. 18 is an explanatory view showing a specific example of a relation between a bevel top position, a bevel foot position, and an actual bevel angle according to an embodiment of the present invention.

FIG. 18 is an explanatory view showing a specific example of a relation between the bevel top position and the bevel foot position, and an actual bevel angle.

Generally, when the wear of the edging tool 11 is progressed, a tip shape of the bevel obtained after edging, is likely to be rounded (see solid line in the figure). On the other hand, when the bevel angle is obtained by using three points of the bevel top position 67 and the bevel foot position 66, usually an angle formed by linearly connecting each point is obtained (see two dot chain lines in the figure). Therefore, if the bevel angle is obtained by simply using the three points of the bevel top position 67 and the bevel foot position 66, the rounded portion of the bevel tip shape is reflected, thus forming a larger angle than an actual bevel angle (see broken line in the figure), and there is a problem that exchange of the edging tool 11 is excessively prompted.

In order to prevent generation of such a problem, after performing search of the bevel top position 67 and the bevel foot position 66, first, a stable section of a bevel slope is selected (S505).

The stable section of the bevel slope means the section where a hypotenuse constituting the bevel shape, has a stable slope (namely, the section where the fluctuation of the slope is suppressed in a prescribed range or less). It is conceivable to select the stable section of the bevel slope as described below (S505).

Figure 19:
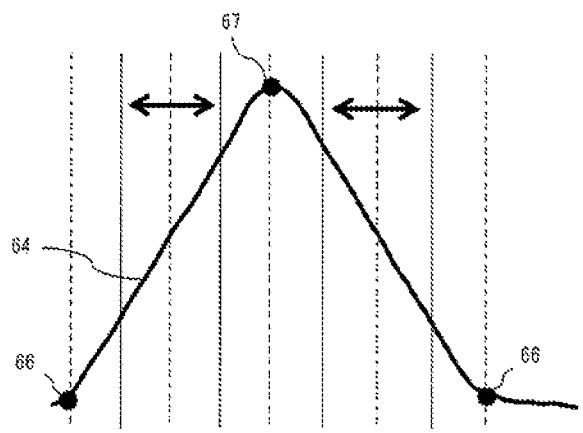
FIG. 19 is an explanatory view showing a specific example of a method of selecting a bevel slope stable section according to an embodiment of the present invention.

FIG. 19 is an explanatory view showing a specific example of a method of selecting the stable section of the bevel slope according to this embodiment.

As the stable section of the bevel slope, for example, the section between the bevel top position 67 and each bevel foot position 66 is divided into four regions respectively, and by focusing on the two divided regions (regions shown by arrows in the figure) positioned in an intermediate portion of the four divided regions, the bevel slope portion belonging to this focused divided region is extracted. This is because an edge region where there is probably a large fluctuation of the bevel slope can be removed, and only the edge shape data 64 of the intermediate region where the slope is stable, can be used.

The number of dividing the region for selecting the stable section of the bevel slope, is not particularly limited, and may be suitably set in consideration of a bevel size, etc.

Then, when the stable section of the bevel slope is selected, linear approximation is performed to the bevel slope in the stable section of the bevel slope, namely, to the edge shape data 64 belonging to the stable section of the bevel slope (S506). The linear approximation may be performed using a publicly-known technique such as a least square method for example.

Thereafter, an angle of an intersection point of two bevel hypotenuses is calculated as measured bevel angle $\theta 1$, from the two approximated bevel hypotenuses (S507). The angle calculation at this time, may be performed by geometric operation using a publicly-known technique.

The measured bevel angle $\theta 1$ is extracted from the edge shape data 64 through the abovementioned procedure. Although the designed bevel angle $\theta 2$ may be extracted by the procedure similar to the abovementioned case of the measured bevel angle $\theta 1$, it is conceivable to extract the designed bevel angle $\theta 2$ by reading it from the database part 41 as a design value, when the information is previously stored in the database part 41.

After the measured bevel angle $\theta 1$ and the designed bevel angle $\theta 2$ are respectively extracted, as shown in FIG. 13, the shape comparing and judging part 43 compares the extracted bevel angles $\theta 1$ and $\theta 2$ with each other, and calculates each differential value (S404). Then, the shape comparing and judging part 43 compares the calculated differential value and the threshold value predefined for each type of the edging tool 11, and judges whether or not the differential value is suppressed within a range of the threshold value (S405). As a result, when the differential values are suppressed within a defined range, the judgment result is OK (S406). Meanwhile, when the differential value is out of the defined range, the characteristic amounts (bevel angles) are not approximately matched with each other, and the shapes supposed to be approximately matched with each other originally, are not so regarded actually, and therefore the shape comparing and judging part 43 so judges that a wearing limit of the edging tool 11 arrives (namely, wearing amount exceeds an allowable range). Namely, the judgment result is NG (S407), and since the shapes are not matched with each other, it is so judged that exchange of the edging tool 11 is required.

This embodiment shows an example of extracting the bevel angle as the characteristic amount of each shape. However, the characteristic amount is not limited thereto, and it is also acceptable that other characteristic amount (such as bevel height) is extracted and compared so that the necessity/non-necessity for exchanging the edging tool 11 is judged. Further, the characteristic amount is not limited to one, and a plurality of characteristic amounts (such as bevel angle and bevel width, etc.) may be simultaneously used for judgment.

(Exchange Time Detecting Step)

In the abovementioned shape comparing and judging step (S204), when the judgment result is NG (S307 and S407), the shape comparing and judging part 43 notifies the information output part 44 of the server device 40 accordingly.

Under such a notification, the information output part 44 performs the exchange time detecting step (S206).

In the exchange time detecting step (S206), when the shape comparing and judging part 43 judges that exchange of the edging tool 11 is required, the information for showing the arrival of the exchange time of the edging tool, is outputted. The processing for such an information output is performed by the information output part 44 of the server device 40, responding to the notification from the shape comparing and judging part 43. The information output part 44 performs information output to an operator of the edger 10 or a system maintenance staff by a publicly-known method such as image display, text display, voice display, and optical display, etc., by using any one of, or a plurality of an image display part of the edger 10 not shown, an image display part of the client device 30 not shown, and an information output part of the edger 10 not shown, or the like. Namely, the information output part 44 notifies the operator, etc., of the matter that a wearing limit arrives in the edging tool 11 and exchange of the edging tool 11 is required. Thus, the operator, etc., can recognize the necessity for exchanging the edging tool 11 of a specific edger 10 in the system.

When an exchange work of the edging tool 11 is performed by the operator, etc., who recognizes the notification content, the edger 10 in which the exchange work is performed, performs edging after the subsequent job, using a new edging tool 11 after exchange. At this time, when there is no tool reference shape in the database part 41, because the type of the new edging tool 11 after exchange is different from the type of the edging tool 11 before exchange, the operator, etc., executes the processing of S201 in FIG. 3.

When the shape comparing and judging part 43 so judges that exchange of the edging is required, such information may be stored in the database part 41, under control of the information output part 44. At this time, the database part 41 stores the information showing that exchange of the edging tool 11 is required, in association with the information for identifying the type of the edging tool 11 (for example, tool ID information), and identification information for specifying the edger 10 on which the edging tool is mounted. By storing the information this way by the database part 41, the server device 40 can perform control processing in such a manner that the edger 10 is notified of error information regarding edging as the subsequent job using the edging tool 11, thereby inhibiting start of the edging as the subsequent job. Whether or not the edger 10 is notified of the error information, may be judged when the edging is issued as the subsequent job.

4. Effect of this Embodiment

According to this embodiment, the following effect can be obtained.

In this embodiment, the edging shape (namely, bevel shape) of the circumferential edge of the spectacle lens after edging by the edger 10 is measured by the shape measurement device 20, and the measurement result is compared with the reference shape of the edging tool 11 specified from the tool reference shape information 42 stored and held in the database part 41, and based on this comparison result, the edger 10 judges the necessity/non-necessity for exchanging the edging tool 11 used by the edger 10. Therefore, even in a case that the tool life of the edging tool 11 is managed, there is no necessity for detecting the tool shape itself of the edging tool 11, thus not causing the reduction, etc., of the production efficiency of the edging. In addition, even if the tool shape itself of the edging tool 11 is not detected, the characteristic specific to the edging is focused, and the edging shape of the circumferential edge of the spectacle lens approximately matching the tool shape is measured, and based on the measurement result, the necessity/non-necessity for exchanging the edging tool 11 is judged. Therefore, the tool life can be judged with high precision. For example, in a conventional technique (see patent documents 1 and 2), parameters (cutting sound or grinding sound, and load values of the tool or the like) for judging the tool life is not necessarily reflect the state of wear, etc., of the tool, thus involving a problem that a judgment result includes error. However, in this embodiment, the tool life is judged based on the measurement result of the edging shape of the circumferential edge of the spectacle lens, which is the shape approximately matching the tool shape. Therefore, unlike the case of the conventional technique, the error is prevented from being included in the judgment result, and as a result, the tool life can be judged with high precision similarly to the case of detecting the tool shape itself.

Namely, in this embodiment, judgment of the tool life of the edging tool 11 used by the edger 10 can be realized by specifically measuring the edging shape of the circumferential edge of the spectacle lens after edging, using the shape measurement device 20, based on a new concept which is absolutely not achieved by the conventional technique, such that the edging shape of the circumferential edge of the spectacle lens is approximately equal to the tool shape of the edging tool 11. Therefore, according to this embodiment, the tool life of the edging tool 11 to be edged, can be judged with higher precision than the conventional technique, while suppressing the reduction, etc., of the production efficiency of edging the spectacle lens.

Also, in this embodiment, the tool life of the edging tool 11 is judged using the measurement result obtained by the shape measurement device 20, and the information stored in the database part 41. However, the measurement result obtained by the shape measurement device 20 is used for judging whether or not the spectacle lens after edging is a good product. In other words, the measurement result obtained by the shape measurement device 20, which is originally used for judging good or bad of the spectacle lens in the system, is also used for judging the tool life of the edging tool 11 in this embodiment. It can also be said that the database part 41 is also used for judging the tool life of the edging tool 11 only by performing a simple pre-edging step of storing the tool reference shape information 42, although the database part 41 is originally used for storing therein each kind of information in the system. Therefore, according to this embodiment, even in a case that the tool life is judged with high precision, the tool life can be judged by using the existent structure in the system such as the shape measurement device 20 and the database part 41, and unlike the conventional technique, a large scale dedicated device structure or a step, etc., is not required.

For example, regarding the cutting sound or the grinding sound disclosed in patent document 1, a sound collector must be used only for judging the tool life. In addition, a huge pre-edging step (such as mechanical leaning step) must be performed for associating the tool life and the cutting sound or the grinding sound sensed by the sound collector. This pre-edging step is the step required for estimating the tool life from a parameter such as the cutting sound or the grinding sound, which is used in different meaning from the tool shape. Also, for example, regarding the load value of the tool disclosed in patent document 2, a measurement device (for example, ammeter) for measuring the load value, must be installed only for judging the tool life. In addition, in order to associate the measured load value and the tool life, predicted load value data is required to be accumulated for each edged material, and a huge pre-edging step (for example collecting step of the predicted load value data) must be performed. The pre-edging step is also the step required for estimating the tool life from the parameter such as the cutting sound or the grinding sound, which is used in different meaning from the tool shape.

Unlike these conventional techniques, this embodiment has the effect of realizing the judgment of the tool life efficiently with high productivity, without requiring a large scale dedicated device or step, etc., because the tool life of the edging tool 11 can be judged only by the simple pre-edging step of storing the tool reference shape information 42, while using the existent structure in the system.

The difference of the edging step will be specifically described here, between a case that the tool life is judged as shown in this embodiment, and a case that the tool life is judged based on the conventional technique (see patent documents 1 and 2, etc.).

Figure 20:
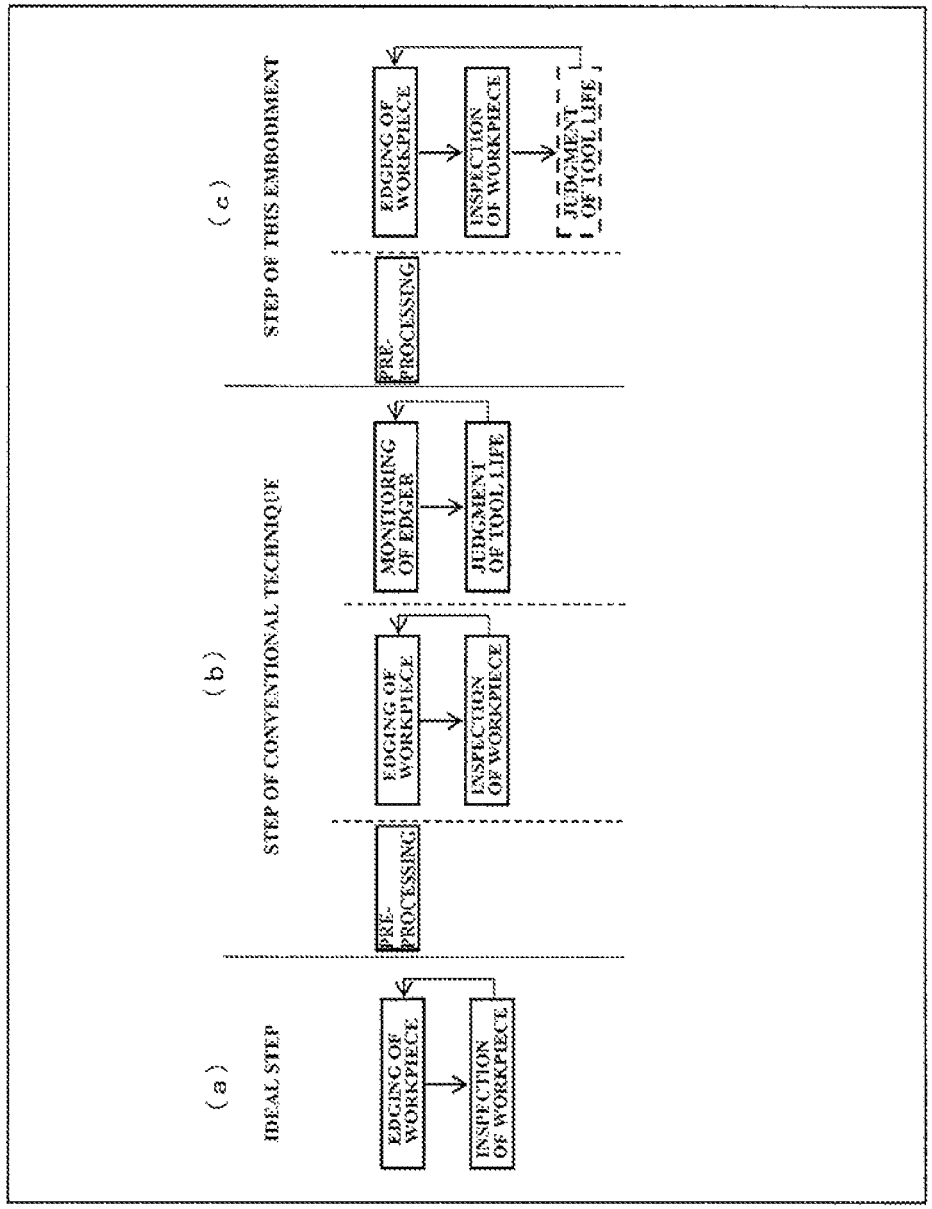
FIG. 20 is an explanatory view showing an outline of a step required for judging a tool life.

FIG. 20 is an explanatory view showing an outline of the step required for judging the tool life.

When the spectacle lens is edged, ideally, it is desirable that there is no great change in the edging step, between a case of judging the tool life, and a case of not judging the tool life. Namely, as shown in FIG. 20, even in the case that the tool life is judged, it is ideal that the edging step includes only the step of performing edging to a workpiece (for example, the edging step of this embodiment (S202), and the step of inspecting the workpiece after edging (for example, the shape measurement step (S203) performed for calculating the circumferential length of the circumferential edge of the lens in this embodiment), similarly to the case that the tool life is not judged. However, actually, there is a step required for judging the tool life.

In the case of the conventional technique, as shown in FIG. 20(*b*), after performing the pre-processing such as the mechanical learning step and the collecting step of the predicted load value data, two additional steps are generated such as monitoring the edger 10 by the sound collector and the ammeter, etc., separately from the edging of the workpiece and the inspection of the workpiece. In addition, the pre-processing step is the step with a great load because a huge data collection, etc., is required.

In contrast, in the case of this embodiment, as shown in FIG. 20(*c*), one additional step of the pre-processing is generated, separately from the edging of the workpiece and the inspection of the workpiece, for not judging the tool life from the parameter regarding the edger 10 liked the conventional case, but for judging the tool life by applying the workpiece shape data obtained during inspection of the workpiece. Namely, in the case of this embodiment, only the storing step (S201) may be performed so that the tool reference shape information 42 regarding the edging tool 11 is stored in the database part 41. Further, in the case of this embodiment, the tool life is judged simultaneously with the inspection of the workpiece. Namely, the shape comparing and judging step (S204) which is the step of judging the tool life, is performed using the measurement result obtained in the shape measurement step (S203) which is the step of inspecting the workpiece after edging. The processing time required for judging the tool life in the shape comparing and judging step (S204) is significantly shorter than the processing time required for inspecting the workpiece (for example, when about several ten seconds of inspection processing time is required, this is probably short, if the processing time for judging the tool life is less than 10 msec).

As described above, in the case of this embodiment, the tool life can be judged efficiently with high productivity by reducing the number of steps, compared with the case of the conventional technique, and the difference from the ideal step sown in FIG. 20(a) can be suppressed as much as possible.

Also, in this embodiment, the shape measurement device 20 measures the edging shape of the circumferential edge of the spectacle lens at least in the edging interference avoidable area, and the shape comparing and judging part 43 of the server device 40 judges the tool life of the edging tool 11 based on the measurement result in the edging interference avoidable area. Thus, the shape comparing and judging part 43 judges the tool life of the edging tool 11 based on the measurement result which is not influenced by the interference of the edging tool 11 (namely, the edging error is small enough so as not to be a problem). Accordingly, the result of judging the tool life performed by the shape comparing and judging part 43 is highly precise and highly reliable that cannot be realized when simply based on the measurement result of the edging shape over the whole circumference of the circumferential edge of the spectacle lens. This is because when it is considered that there is a great difference between the edging shape (bevel cross-sectional shape) of the circumferential edge of the lens and the reference shape of the edging tool 11, it is possible to exclude the possibility that such a difference is generated from the edging error, because the measurement result of the edging shape is not influenced by the interference of the tool, and it can be so judged that the difference is generated by wear of the edging tool 11. In addition, in judging the tool life of the edging tool 11, the processing load for judging the tool life can be reduced and the processing efficiency can be improved even if data selection processing is additionally generated, by limiting the measurement result of the edging shape to the measurement result obtained in the edging interference avoidable area, compared with a case that the tool life is judged based on the measurement result over the whole circumference of the circumferential edge of the spectacle lens.

Namely, as described in this embodiment, when the tool life of the edging tool 11 is judged based on the measurement result of the edging shape obtained in the edging interference avoidable area, the result of judging the tool life can be highly precise and highly reliable, and in addition, the processing load for judging the tool life can be reduced and the processing efficiency can be improved.

Particularly, in this embodiment, the edging interference avoidable area is selectively extracted, based on the change ratio of the bevel tip locus in the Z-axis direction (thickness direction of the lens) extending in a circumferential direction of the circumferential edge of the spectacle lens. Specifically, the point where the change ratio in the Z-axis direction is smallest in the circumferential area, is set as the point constituting the edging interference avoidable area. Thus, when the edging interference avoidable area is selectively extracted based on the change ratio of the bevel tip locus in the Z-axis direction, the selective extraction can be performed with less processing load by only focusing on a coordinate value of the bevel tip locus in the Z-axis direction. In addition, even in a case of such a less processing load, the point constituting the edging interference avoidable area (namely, the point where the interference of the edging tool 11 is hardly generated) can be surely extracted, based on the change ratio of the bevel tip locus in the Z-axis direction.

Further, in this embodiment, when the tool life of the edging tool 11 is judged, it is also acceptable that the edging shape of the circumferential edge of the spectacle lens and the reference shape of the edging tool 11 are compared, then a difference degree between them is calculated, and the calculation result of the difference degree is divided by the edge thickness of the lens at a measurement point of the edging shape, and a value converted to the difference degree per unit thickness is compared with a predefined threshold value, to thereby judge whether or not wear is generated in the edging tool 11. Thus, by judging the tool life of the edging tool 11 using the value converted to the difference degree per unit thickness by dividing the difference degree by the edge thickness of the lens, the tool life of the edging tool 11 can be judged by one threshold value, even in a case that the edge thickness of the spectacle lens is different in each lens. Further, the calculation time is faster in a case that SAD and SSD, etc., are used, than a case that calculation of the characteristic amount is required, because calculation such as second-order differential and a least square method are not necessary.

Further, in this embodiment, when the tool life of the edging tool 11 is judged, the characteristic amount of the edging shape of the circumferential edge of the spectacle lens, and the characteristic amount of the reference shape of the edging tool 11 are extracted, and these characteristic amounts are compared with each other, to thereby judge whether or not wear is generated in the edging tool 11. Thus, by judging the tool life of the edging tool 11 using the characteristic amount (such as bevel angle) for effectively specifying the characteristic of each shape, a more intuitive value can be preferably utilized, compared with a case that the difference is evaluated by the method such as SAD and SSD, etc.

5. Modified Example, Etc.

Embodiments of the present invention have been described above. However, the abovementioned disclosure contents show exemplary embodiments of the present invention. Namely, a technical range of the present invention is not limited to the abovementioned exemplary embodiments.

For example, this embodiment shows the case that the database part 41, the shape comparing and judging part 43, and the information output part 44 which are required for judging the tool life, exist in the server device 40. However, the present invention is not limited thereto. Namely, it is a matter of course that not only the shape comparing and judging part 43 and the information output part 44, but also the function as the memory part that manages the tool reference shape information 42 (namely, the function of a part of the database part 41), is not necessarily required to exist in the server device 40, and may exist in other device in the system (for example, in the control computer or the client device 30 in the shape measurement device 20).

Further, this embodiment shows a case that point 63a where the change ratio of the bevel tip locus in the Z-axis direction is smallest, is selected as the point constituting the edging interference avoidable area, in the data selection processing of the shape comparing and judging step (S204). However, the present invention is not limited thereto. Namely, selection of other measurement point can also be considered, if this is the point constituting the edging interference avoidable area. As other measurement point, a point where a curvature of the bevel tip locus is largest in the circumferential area (namely, the point corresponding to the top of the bevel tip locus), can be given in the variation of the curvature of the bevel tip locus when the bevel tip locus is observed in plan view. This is because if the curvature is large, the interference of the edging tool 11 which is a factor of thinning or distortion, etc., of the bevel shape, is hardly generated even if the edging tool 11 is changed in the Z-axis direction, unlike the case that the curvature is small.

Further, this embodiment shows a case that the data selection processing of the shape comparing and judging step (S204) is performed by the shape comparing and judging part 43 of the server device 40. However, the present invention is not limited thereto, and for example it can be considered that the data selection processing is performed at the shape measurement device 20 side, and the edge shape data after selection is sent to the server device 40.

Further, this embodiment shows a case that the shape comparing and judging step (S204) includes the data selection processing, from a viewpoint of the processing load and the processing efficiency of the comparing and judging processing in the shape comparing and judging step (S204). However, the present invention is not limited thereto. Namely, when there is a room in the processing load and the processing efficiency, etc., and when the change ratio in the Z-axis direction is sufficiently small at all measurement points, it can be considered that the edge shape data at all measurement points 63 sent from the shape measurement device 20, is used for the comparing and judging processing.

Further, this embodiment shows a case that the edging job is mainly executed according to the order from the terminal device installed at the spectacle shop. However, the present invention is not limited thereto, and for example, the edging job can also be executed according to the order from the terminal device installed not in the spectacle shop but in the edging center. Specifically, the following mechanism can be constructed: namely, the shape of the spectacle frame is measured by a measurement machine installed in the edging center, and the edged lens is framed into the spectacle frame whose shape is measured, which is then delivered as a spectacle finished product.

DESCRIPTION OF SIGNS AND NUMERALS

10 Edger
11 Edging tool
20 Shape measurement device
30 Client device
31 Control program part
40 Server device
41 Database part (memory part)
42 Tool reference shape information
43 Shape comparing and judging part
44 Information output part
50 Communication line
61 Uncut lens
62 Spectacle lens
63, 63a Measurement point
64 Edge shape data
65 Reference shape data
66 Bevel foot position
67 Bevel top position

The invention claimed is:

1. A lens edging system, comprising:
an edger configured to perform edging of a spectacle lens using an edging tool;
a shape measurement device configured to measure an edging shape of a circumferential edge of the spectacle lens after edging by the edger;
a memory part configured to store information regarding a reference shape of the edging tool used by the edger;
a shape comparing and judging part configured to compare a measurement result of the edging shape obtained by the shape measurement device in an edging interference avoidable area of the edging tool on the circumferential edge of the spectacle lens and a reference shape of the edging tool specified from the information stored in the memory part, and judge necessity/non-necessity for exchanging the edging tool based on a comparison result; and
an information output part configured to output information regarding necessity for exchange when the shape comparing and judging part so judges.

2. The lens edging system of claim 1, wherein the edging interference avoidable area is selectively extracted based on a change ratio of a circumferential locus of the circumferential edge of the spectacle lens.

3. The lens edging system of claim 1, wherein the shape comparing and judging part judges necessity/non-necessity for exchanging the edging tool, by comparing an edging shape of the circumferential edge of the spectacle lens and a reference shape of the edging tool and calculating a difference degree between them, and dividing a calculation result of the difference degree by an edge thickness of the lens at a measurement point of the edging shape, thereby obtaining a value converted to a difference per unit thickness, and comparing the converted value and a predefined threshold value.

4. The lens edging system of claim 1, wherein the shape comparing and judging part extracts a characteristic amount of the edging shape of the circumferential edge of the spectacle lens and a characteristic amount of the reference shape of the edging tool, and compares these characteristic amounts with each other, to thereby judge necessity/non-necessity for exchanging the edging tool.

5. The lens edging system of claim 2, wherein the shape comparing and judging part judges necessity/non-necessity for exchanging the edging tool, by comparing an edging shape of the circumferential edge of the spectacle lens and a reference shape of the edging tool and calculating a difference degree between them, and dividing a calculation result of the difference degree by an edge thickness of the lens at a measurement point of the edging shape, thereby obtaining a value converted to a difference per unit thickness, and comparing the converted value and a predefined threshold value.

6. The lens edging system of claim 2, wherein the shape comparing and judging part extracts a characteristic amount of the edging shape of the circumferential edge of the spectacle lens and a characteristic amount of the reference shape of the edging tool, and compares these characteristic amounts with each other, to thereby judge necessity/non-necessity for exchanging the edging tool.

7. A method of detecting a tool exchange time for detecting an exchange time of an edging tool used by an edger that performs edging of a spectacle lens, comprising:
the storing step of previously storing information regarding a reference shape of the edging tool;

the shape measurement step of measuring an edging shape of a circumferential edge of a spectacle lens after edging by the edger;

the shape comparing and judging step of comparing a measurement result of the edging shape obtained in an edging interference avoidable area of the edging tool on the circumferential edge of the spectacle lens and a reference shape of the edging tool specified from the information stored in the storing step when measurement is performed in the shape measurement step, and judging necessity/non-necessity for exchanging the edging tool based on a comparison result; and the exchange time detecting step of outputting information regarding the exchange time of the edging tool when it is so judged in the shape comparing and judging step.

8. The method of detecting a tool exchange time of claim 7, wherein the shape comparing and judging step includes data selection processing of selectively extracting the measurement result obtained in the shape measurement step, which is a comparison object to be compared with a reference shape of the edging tool.

9. A method of manufacturing a spectacle lens, wherein a spectacle lens is formed by edging using an edger having an edging tool whose exchange time is managed by the method of claim 7.

10. A method of manufacturing a spectacle lens, wherein a spectacle lens is formed by edging using an edger having an edging tool whose exchange time is managed by the method of claim 8.

* * * * *